US006739353B2

(12) United States Patent
Lechuga

(10) Patent No.: US 6,739,353 B2
(45) Date of Patent: May 25, 2004

(54) MULTI-SECTION PROTECTIVE COVER SYSTEM FOR HOT WATER PIPES

(76) Inventor: Gabriel Lechuga, 7 Cambridge Rd., Rancho Mirage, CA (US) 92234

( * ) Notice: Subject to any disclaimer, the term of this patent is extended or adjusted under 35 U.S.C. 154(b) by 0 days.

(21) Appl. No.: 10/081,637

(22) Filed: Feb. 20, 2002

(65) Prior Publication Data

US 2002/0112761 A1 Aug. 22, 2002

Related U.S. Application Data

(60) Provisional application No. 60/270,346, filed on Feb. 21, 2001, and provisional application No. 60/273,011, filed on Mar. 2, 2001.

(51) Int. Cl.[7] .................................................. F16L 9/22
(52) U.S. Cl. ........................ 137/375; 138/155; 138/158; 285/47
(58) Field of Search ........................... 137/375; 285/47; 138/155, 158

(56) References Cited

U.S. PATENT DOCUMENTS

| | | | | |
|---|---|---|---|---|
| 5,055,334 A | * | 10/1991 | Lechuga | 137/375 |
| 5,303,730 A | * | 4/1994 | Trueb et al. | 137/375 |
| 5,360,031 A | * | 11/1994 | Trueb et al. | 137/375 |
| 5,419,364 A | * | 5/1995 | Trueb et al. | 137/375 |
| 5,454,392 A | * | 10/1995 | Trueb et al. | 137/375 |
| 5,503,193 A | * | 4/1996 | Nygaard | 138/149 |
| 5,524,669 A | * | 6/1996 | Trueb et al. | 137/375 |
| 5,540,255 A | * | 7/1996 | Trueb et al. | 137/375 |
| 5,564,463 A | * | 10/1996 | Helmsderfer | 137/375 |
| 5,678,598 A | * | 10/1997 | Helmsderfer | 137/375 |
| 5,901,739 A | * | 5/1999 | Helmsderfer | 137/375 |
| 5,915,412 A | * | 6/1999 | Helmsderfer | 137/375 |

* cited by examiner

*Primary Examiner*—A. Michael Chambers
(74) *Attorney, Agent, or Firm*—Robert J. Schaap

(57) ABSTRACT

A unique protective cover system for hot water pipes and other pipe installations and which relies upon a plurality of jackets capable of being disposed about the pipes. In one embodiment of the invention, there is provided an under-sink heat protective cover system having a first J-shaped jacket to cover a J-shaped pipe arrangement or J-trap and a portion of straight pipe cover to cover the waste arm pipe in an under-sink pipe installation. Moreover, a unique coupling mechanism in the mating jackets allows one jacket to be fitted and tightly connected with the other jacket. Each of the jackets are slit longitudinally so that they can be spread apart at the slit and fitted on the pipes of the installation. A unique locking system is provided to retentively and tightly hold each jacket around a pipe section. Moreover, in another embodiment, fiber fastening strips are located adjacent the opposed edges of the slit for quickly releasably locking together with two edges of the jacket adjacent the slit.

35 Claims, 20 Drawing Sheets

MULTI-SECTION PROTECTIVE COVER SYSTEM FOR HOT WATER PIPES

RELATED APPLICATION

This application is based on and claims priority from my provisional patent application Ser. No. 60/270,346, filed Feb. 21, 2001, for Protective Cover System for Hot Water Pipes (J and Straight Pipe Configuration with Unique Coupling Therefor), as well as my provisional patent application Serial No. 60/273,011, filed Mar. 2, 2001 for Protective Cover System for Hot Water Pipes.

BACKGROUND OF THE INVENTION

1. Field of the Invention

This invention relates in general to certain new and useful improvements in a pipe cover system and more particularly, to a type of under-sink pipe protective system which includes a plurality of jackets capable of being disposed about a P-trap and waste arm pipe assembly in an under-sink pipe arrangement.

2. Brief Description of Related Art

In recent years, the need and desirability of providing a protective cover over pipe fixtures for plumbing installations has become well recognized. This is particularly important in public facilities, such as restaurants and like institutions, for unambulatory individuals and, particularly, wheelchair bound individuals. In the case of the wheelchair bound individual who attempts to move a wheelchair close to a sink, that individual suffers the risk of being sufficiently close to piping under the sink that his or her knees or lower legs will come into contact with the hot water pipe of the sink. Contact with a hot water pipe can result in a rather serious burn.

In other cases where maintenance personnel or the like attempt to repair pipes or to maintain or even inspect the pipes in an under-sink installation or in another installation, they will frequently engage one or more pieces. If there are any sharp edges present, such as on the locking nuts or the like, these personnel can easily and readily cut their hands. Inasmuch as the plumbing conditions are not particularly clean on the exterior, cuts must be treated quickly or infectious situations can result.

In the relatively recent past, and particularly in the United States, the American Disabilities Act (ADA Act) provides for a requirement to insulate under-sink piping and similar piping in plumbing fixture installations. This requirement exists in order to overcome or at least reduce the possibility of burn injury to wheelchair bound individuals and others.

There are numerous U.S. patents which disclose protective covers for hot water pipes. Representative of these patents are U.S Pat. No. 5,055,335 to Gabriel Lechuga. This reference discloses one of the first highly effective pipe covers having a longitudinally slit pipe cover jacket which can be disposed about and secured to a hot water pipe.

There are also other references disclosing injection molded pipe covers, such as vinyl injection molded, heat protective pipe covers of the type illustrated in U.S. Pat. No. 5,678,598 to Helmsderfer, U.S. Pat. No. 5,901,739 to Helmsderfer, U.S. Pat. No. 5,564,463 to Helmsderfer, U.S. Pat. No. 5,915,412 to Helmsderfer, U.S. Pat. No. 5,303,730 to Trueb, et al, and U.S. Pat. No. 5,360,031 to Trueb, et al. These references all disclose various embodiments of heat protective covers for hot water pipes. The heat protective cover for hot water pipes disclosed in the Helmsderfer U.S. Pat. No. 5,678,598 is permanently installed on the pipe itself. In the other prior art references, the jacket is longitudinally slit along its length so as to be capable of having the edges adjacent the slit spread apart and then opened sufficiently to receive a pipe section. The edges of the slit are then allowed to close and held together by some fastening means, such as locking pins, or the like, as taught in the aforesaid Lechuga patent.

There are numerous problems associated with the heat protective cover systems of the type taught in certain of the prior art. First of all, they are designed for tight fitting disposition about the pipes and, hence, they are difficult install and requires effort on the part of the installer to properly position same. Moreover, the need to install locking pins in aligned apertures on opposite sides of the slit is time consuming and, in some cases, difficult to lock depending upon the space available in an under-sink installation. Each of the prior art jackets are assembled together in a desired configuration to cover a pipe assembly.

Frequently, many under-sink pipe installations comprise a J-shaped pipe and an L-shaped pipe with the L-shaped pipe connected to the short leg of J-shaped pipe. Consequently, many of the prior cover systems use a J-shaped cover or jacket and an L-shaped cover or jacket. Not only is this unnecessary, but in many cases it can be undesirable. It would be desirable to provide one cover for almost the entire J-shaped pipe and a straight pipe cover section for the straight leg of the L-shaped pipe. Moreover, the prior art cover systems use a complex fastening means, as aforesaid. It would be desirable to provide a cover system where installation, and even maintenance, could be considerably reduced. It would also be desirable to provide a cover system where the jackets are actually spaced apart from the walls of the pipe and which do not necessarily provide a snug fitting disposition thereabout.

Certain of the prior art cover assemblies rely upon an enlarged socket being formed on an end of the one of the jackets as, for example, an end of the J-shaped jacket, as well as a portion of the other jacket which extends into that socket. Frequently, there is no means to lock one jacket to the other and, hence, they are not necessarily tamper resistant.

OBJECTS OF THE INVENTION

It is, therefore, one of the primary objects of the present invention to provide a heat protective cover system for water carrying pipes comprising a plurality of jackets which are capable of being fitted about individual pipe sections in a pipe configuration, and follow the general contour of the pipe configuration.

It is another object of the present invention to provide a heat protective cover system of the type stated which provides for a unique locking mechanism for holding two jackets disposed over portions of the pipe configuration in an assembled relationship.

It is a further object of the present invention to provide a heat protective cover system of the type stated which includes a longitudinal slit forming a pair of overlapping edges in a jacket for being envelopingly disposed about a pipe section and which includes unique fastening means capable of being easily and quickly operated.

It is an additional object of the present invention to provide a protective cover system of the type stated in which the various components of the cover system do not precisely follow the shapes of the pipes forming part of a pipe installation.

It is also an object of the present invention to provide a protective cover system of the type stated which is effectively usable to fit a wide variety of pipe installations, easily installable and capable of protecting against heat burns or cuts and abrasions.

It is still another object of the present invention to provide a heat protective cover system of the type stated which can be manufactured at a relatively low cost and which is highly reliable in operation.

It is another salient object of the present invention to provide a method of supplying a protective cover system about pipes of a plumbing configuration in a highly efficient manner.

It is a further object of the present invention to provide a heat protective cover system of the type stated in which a plurality of cover pieces are assembled together about a pipe installation, and where each of the cover pieces can optionally have a non-circular cross-sectional shape.

With the above and other objects in view, my invention resides in the novel features of form, construction, arrangement and combination of parts and components presently described and pointed out in the claims.

BRIEF SUMMARY OF THE INVENTION

The present invention broadly relates to a protective cover system for disposition about hot water pipes forming part of a plumbing installation comprised of a plurality of pipes. The heat protective cover system comprises a plurality of individual jackets which are each longitudinally slit along a portion of their length forming a pair of abutable edges or surfaces which are capable of being spread apart to allow the jacket to be enveloping wrapped about individual pipe sections. The edges or surfaces are then brought back together and secured by a unique locking means, as hereinafter described. Moreover, a plurality of jacket sections are secured to one another by a unique securement means in accordance with the invention.

In order to cover a J-shaped pipe and an L-shaped pipe which are connected in such manner that the short leg of the L-shaped pipe is connected to the short leg of the J-shaped pipe to form a P-trap, the prior art utilizes a J-shaped pipe cover and an L-shaped pipe cover. In accordance with the present invention, a single cover or jacket is designed to cover the entire J-shaped pipe section as well as the short leg of the L-shaped pipe. A single cylindrically shaped elongate jacket is sized to extend over only the long leg of the L-shaped pipe.

After the various jacket sections are assembled about the individual pipe pieces, they are secured together by means of cable clamps which are literally secured to or integrally formed with the inside of each of the jackets at points in proximity to the longitudinal slit. In this way, the ends of the cable ties can be locked together and thereby physically hold the jacket on the pipe. In addition, the jackets, in one embodiment, are provided with fiber fastening strips adjacent the longitudinal slit so that the jacket sections may be easily brought together and thereby enveloping wrap the jacket about the pipe section.

In a conventional under-sink pipe installation, the J-shaped pipe has an end which is coupled to a downwardly facing opening of the L-shaped or waste arm pipe. Thus, in the prior art, the J-shaped pipe cover or jacket covered the J-shaped pipe (often referred to as the J-trap pipe), and an L-shaped pipe cover or jacket covered the L-shaped pipe. In the present invention, the jackets do not necessarily have to follow the exact contour of the pipe installation. Several embodiments of unique securement means are provided in this invention for physically securing the end of the J-shaped jacket to the straight pipe jacket. In one embodiment, the J-shaped jacket can be provided with a cylindrically shaped protrusion which extends into the downwardly facing opening of the straight jacket and releasably secured thereto by means of screw fasteners or the like.

In another embodiment of the present invention, and for each section of a pipe installation, there are provided a plurality of individual pipe covers capable of being disposed about a section of that pipe installation.

Each of the individual cover pieces may optionally have a non-circular cross-sectional shape. Moreover, certain of the pipe cover pieces will have projections extending from an abutting end of one pipe cover piece to become inserted into a socket at the end of a next adjacent cover piece. In this way, the individual pipe cover sections will not only abut against one another with a continuous outer size and shape, but there will be no noticeable bulky connection between the two. In another embodiment, a projection, which may be a circular projection, is integrally formed at the end of one pipe cover and fits within a circular socket at the bore of the next abutting pipe section. In still another embodiment, the projection on the one pipe section is provided with a locking flange and is capable of fitting into a correspondingly shaped groove in the bore of the next abutting pipe section. Other locking systems are disclosed herein.

The heat protective cover system of the invention is also uniquely designed so that it not necessarily follow the precise contour of pipes in a typical pipe configuration, such as a combination of a J-shape pipe section and an L-shape pipe section. In other words, the heat protective cover system of the invention can even hide the typical configuration of individual pipe pieces.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
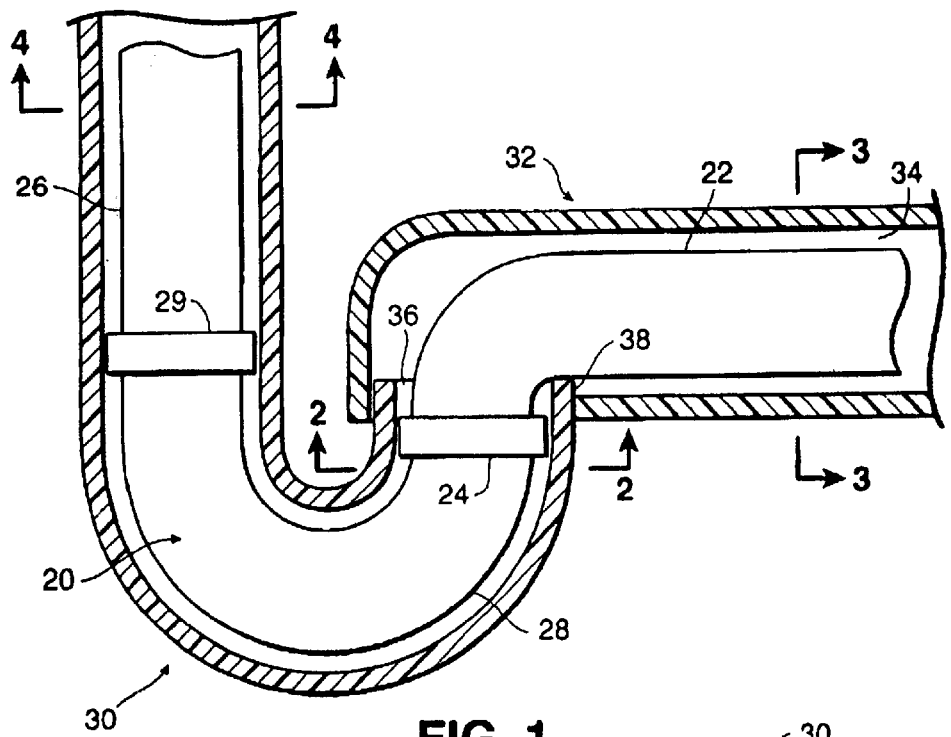
Figure 2:
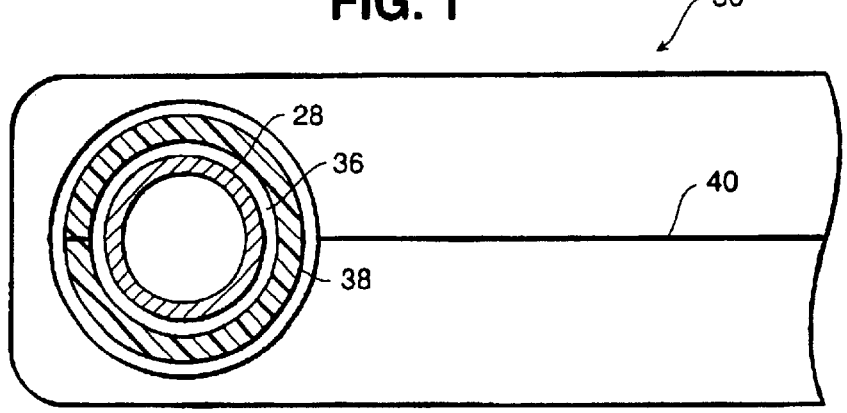
Figure 3:
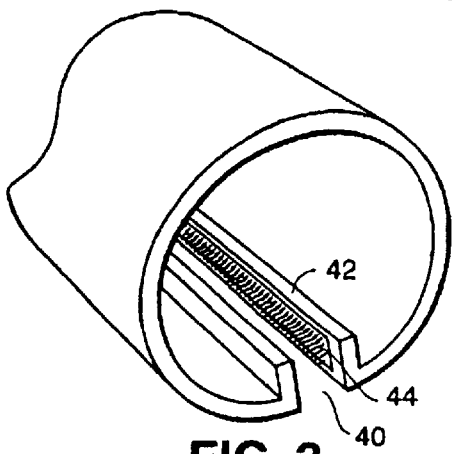
Figure 3A:
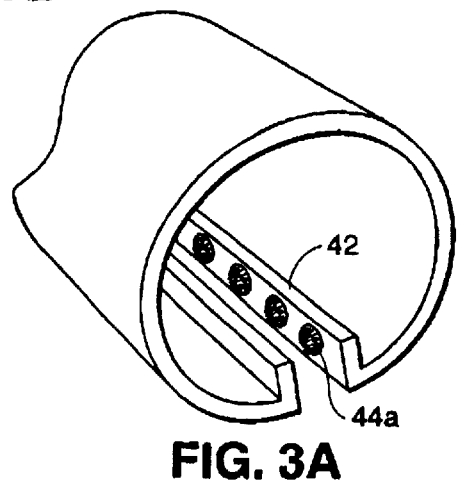
Figure 4:
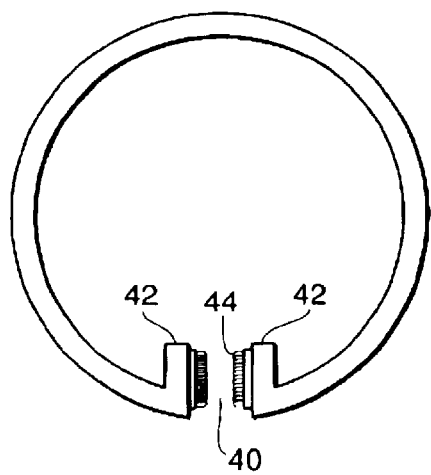
Figure 5:
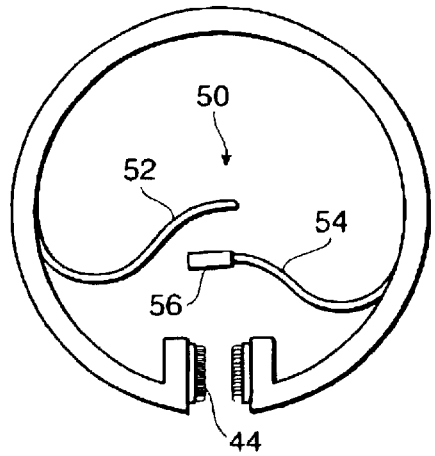
Figure 6:
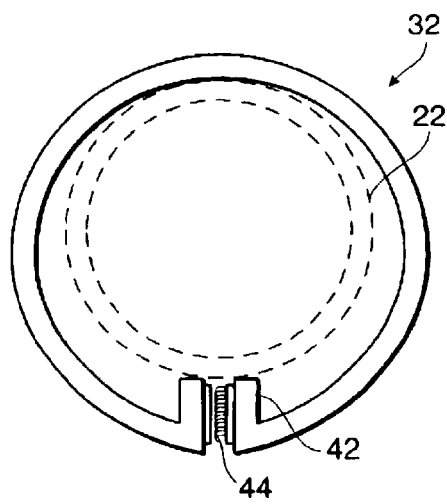
Figure 6A:
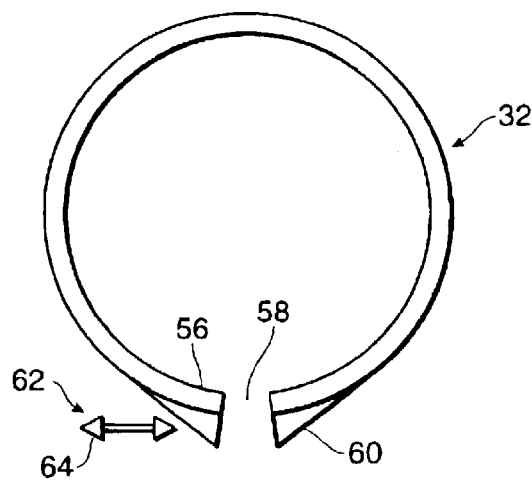
Figure 7:
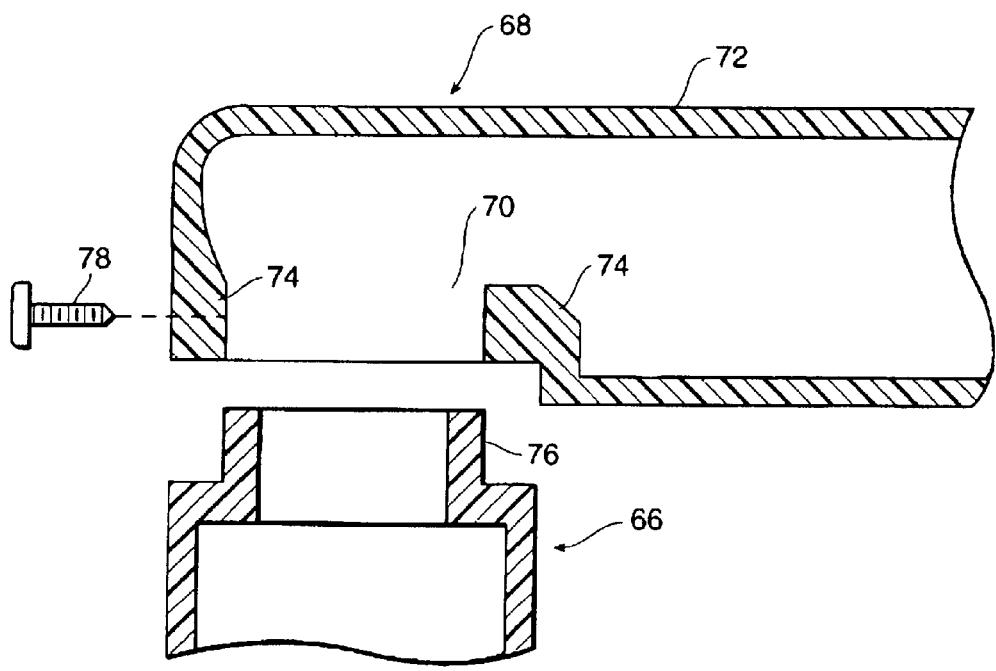
Figure 8:
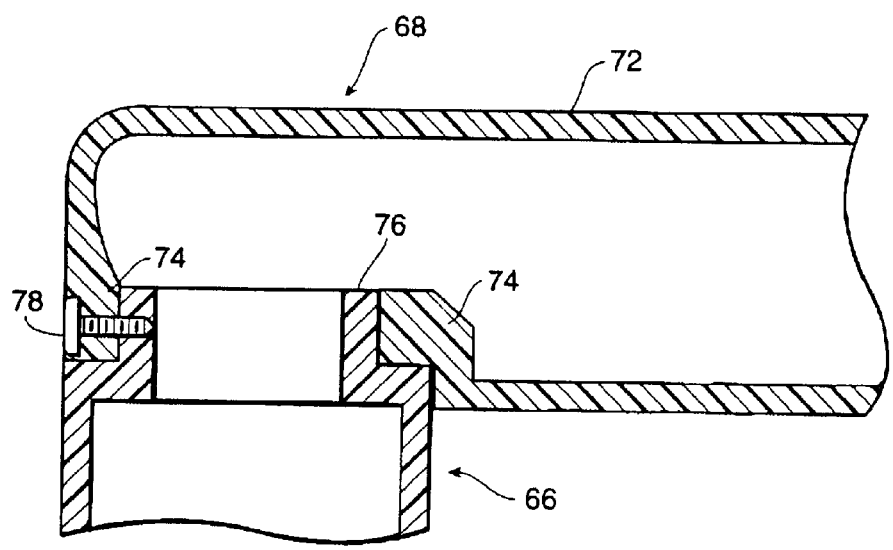
Figure 9:
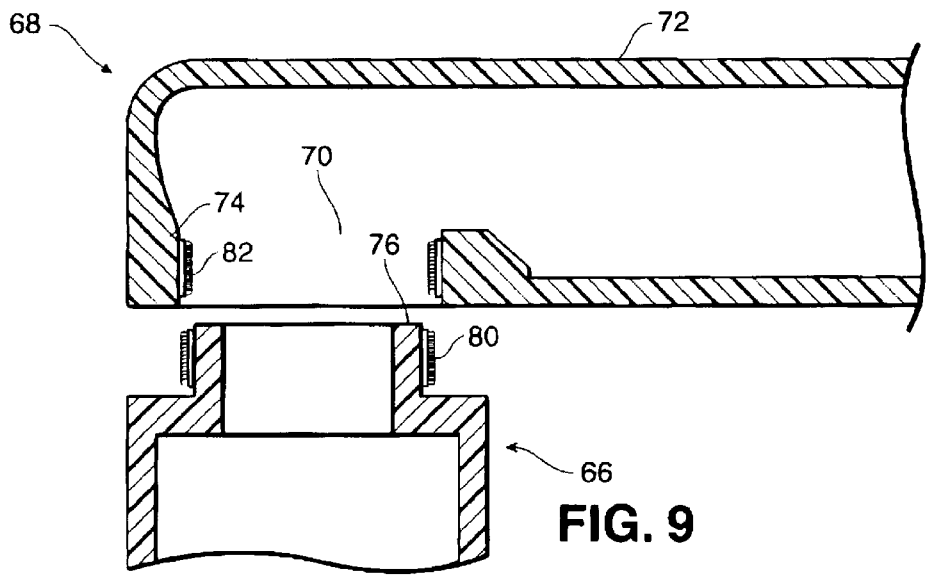
Figure 10:
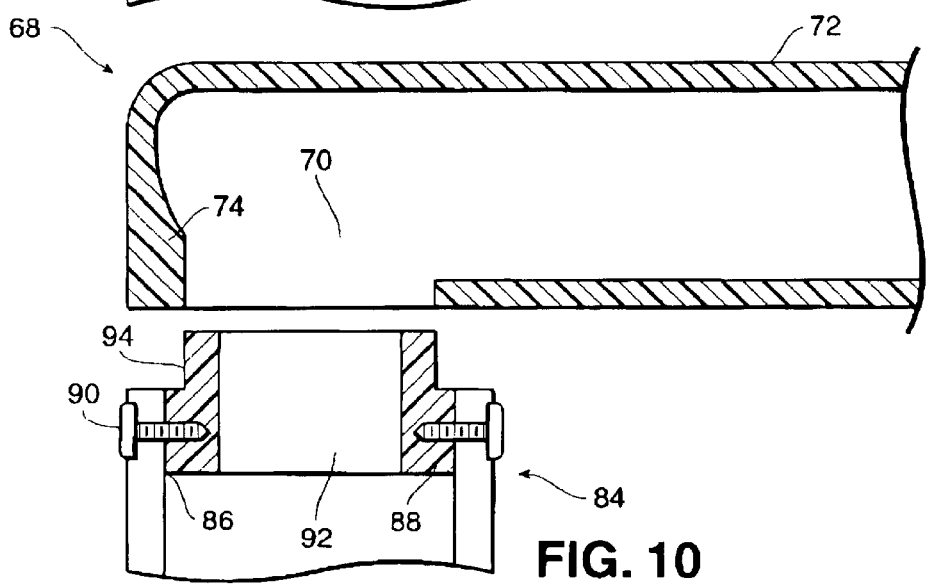
Figure 11:
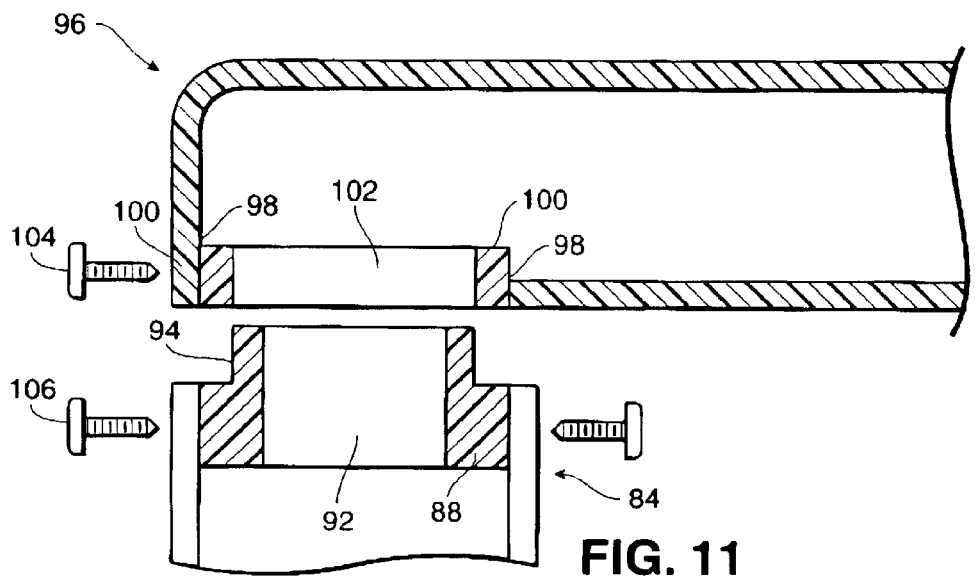
Figure 12:
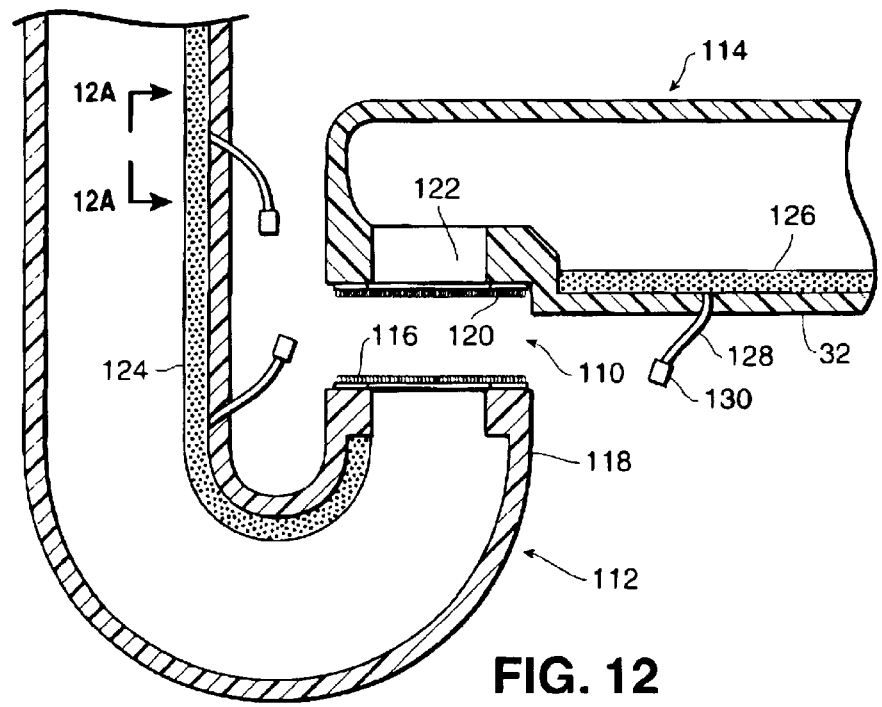
Figure 12A:
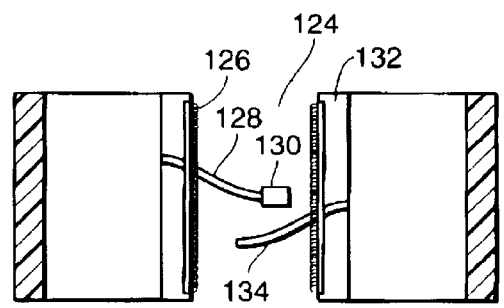
Figure 13:
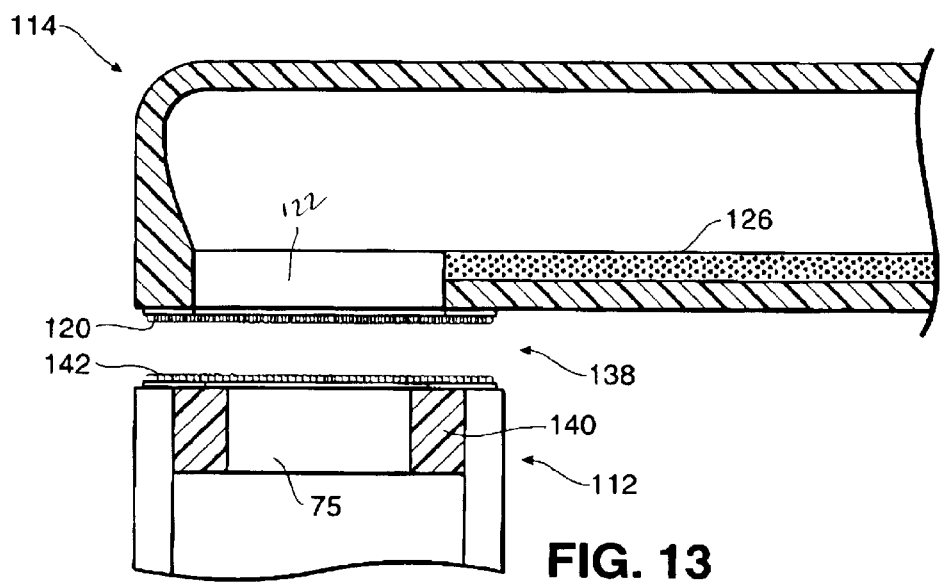
Figure 14:
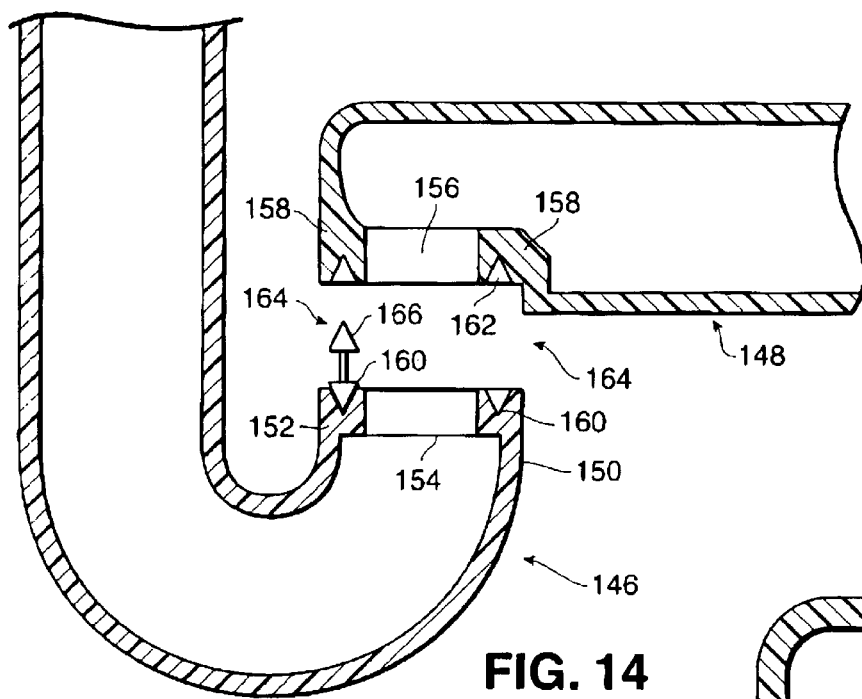
Figure 14A:
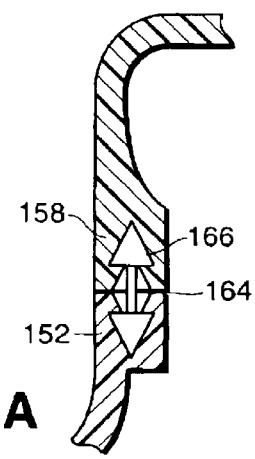
Figure 15:
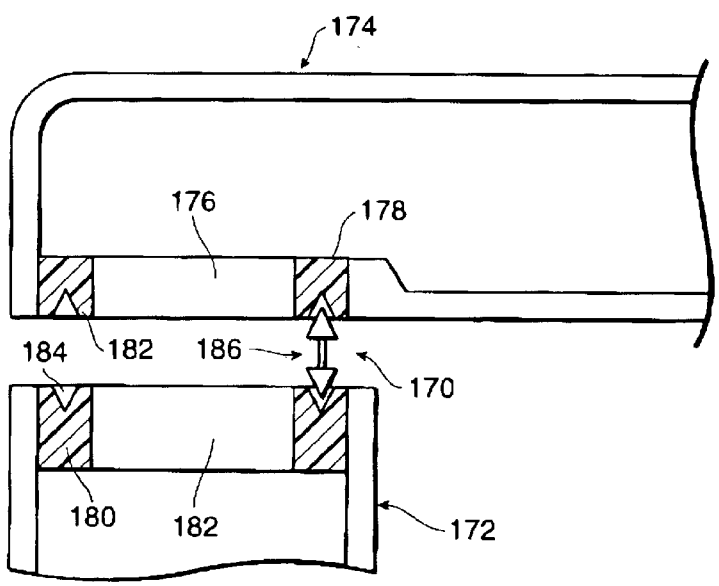
Figure 16:
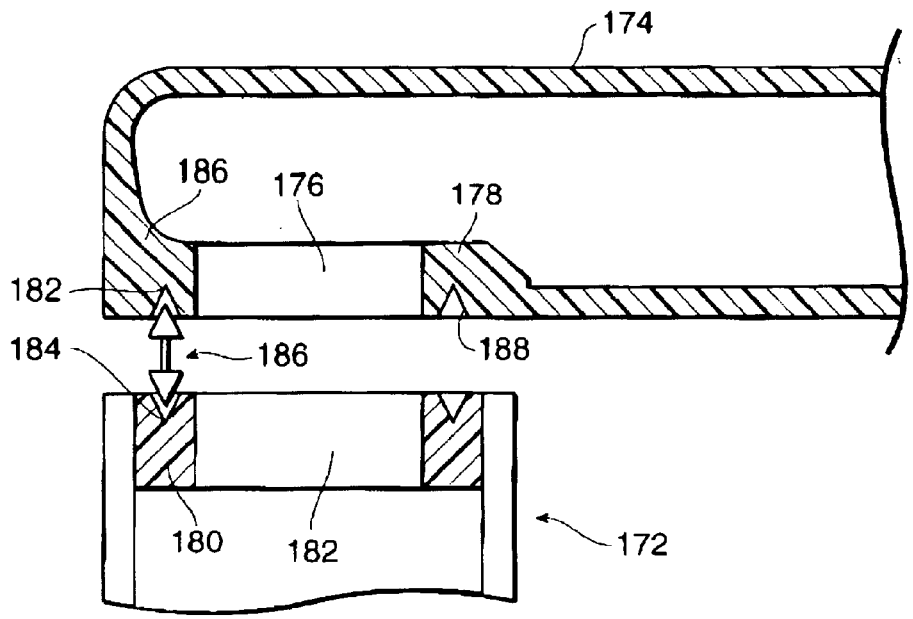
Figure 17:
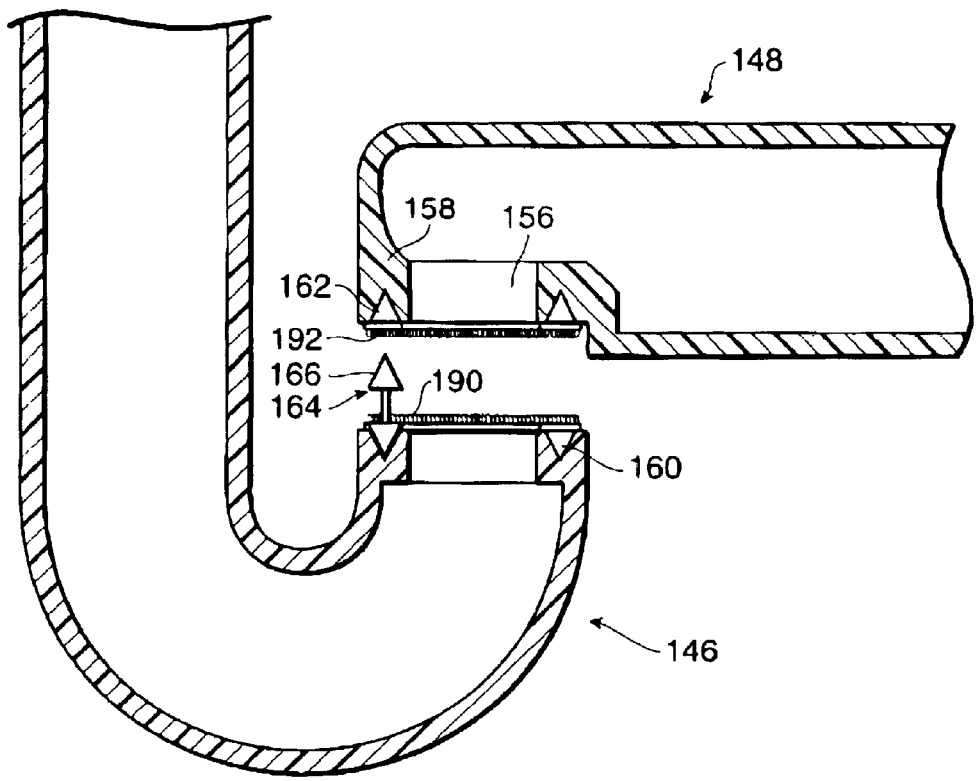
Figure 18:
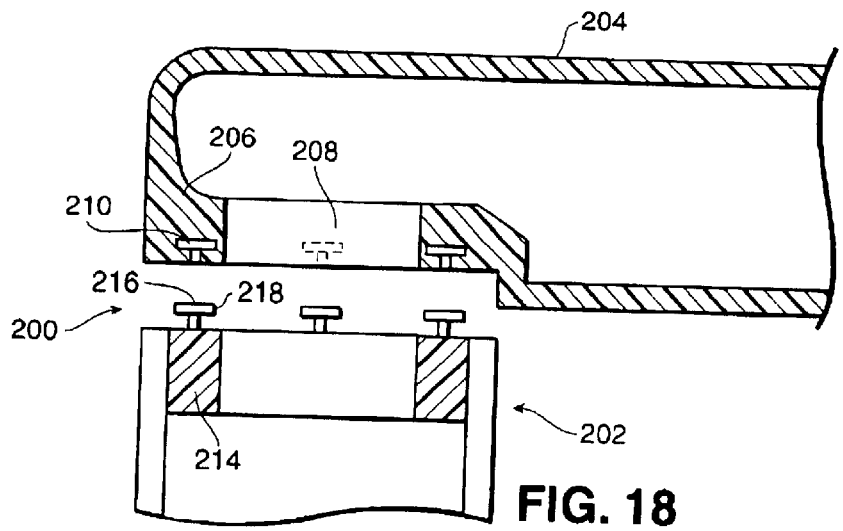
Figure 19:
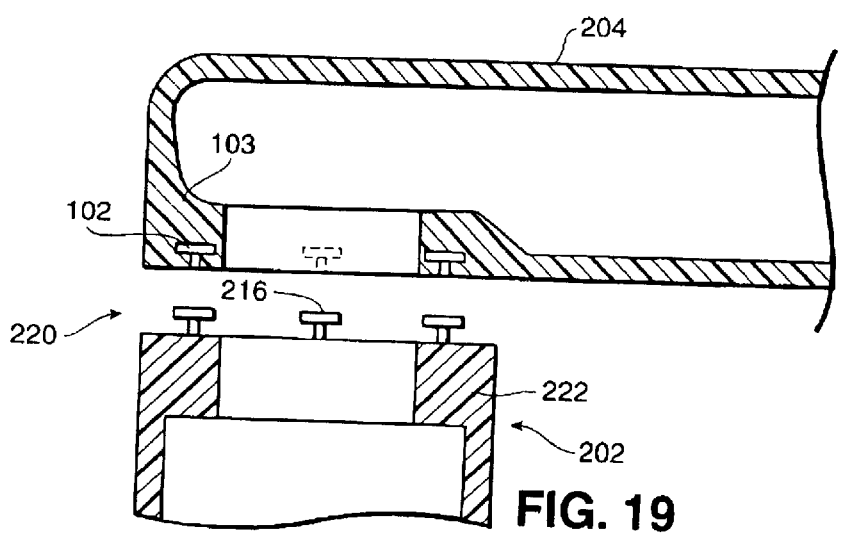
Figure 20:
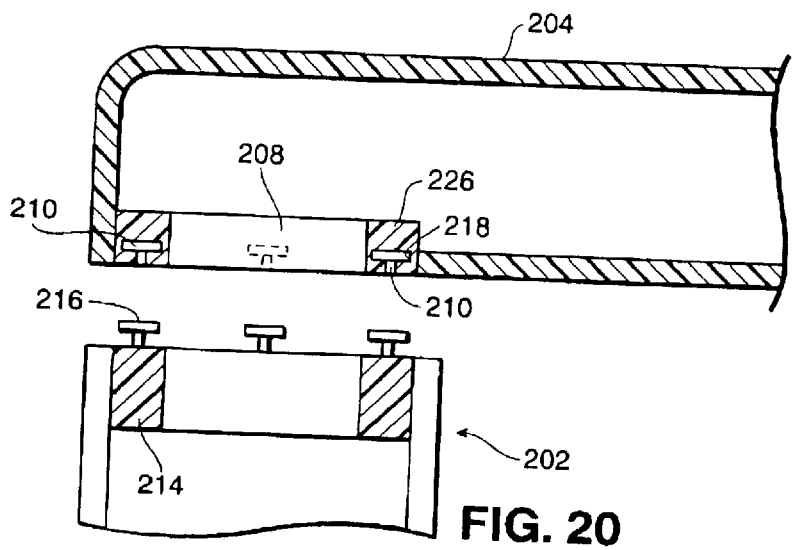
Figure 21:
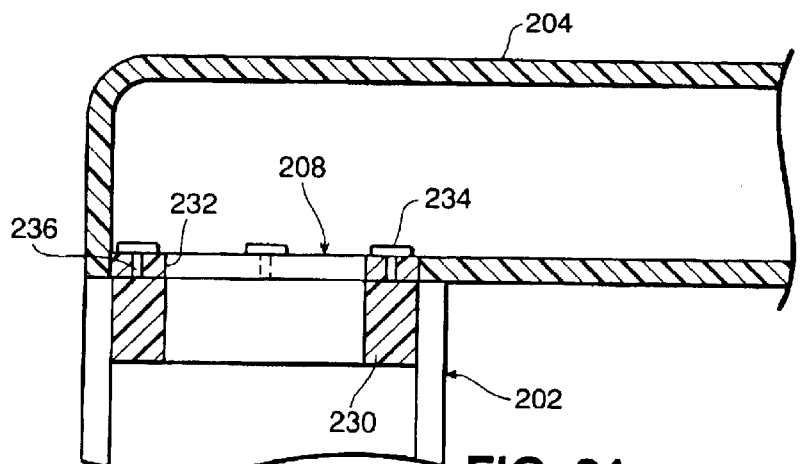
Figure 22:
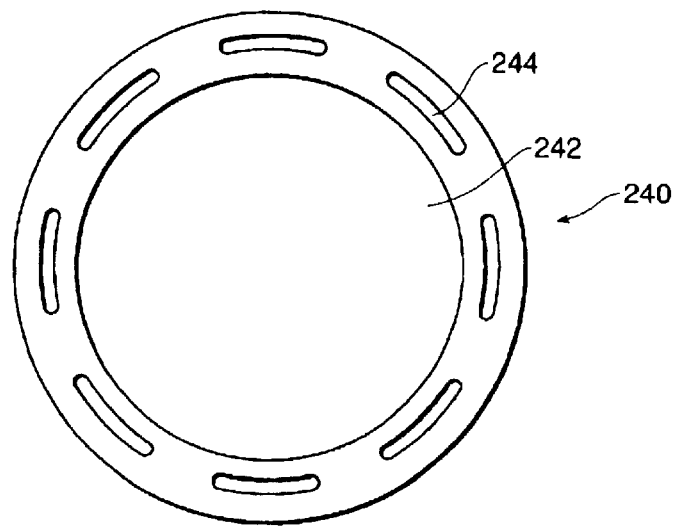
Figure 23:
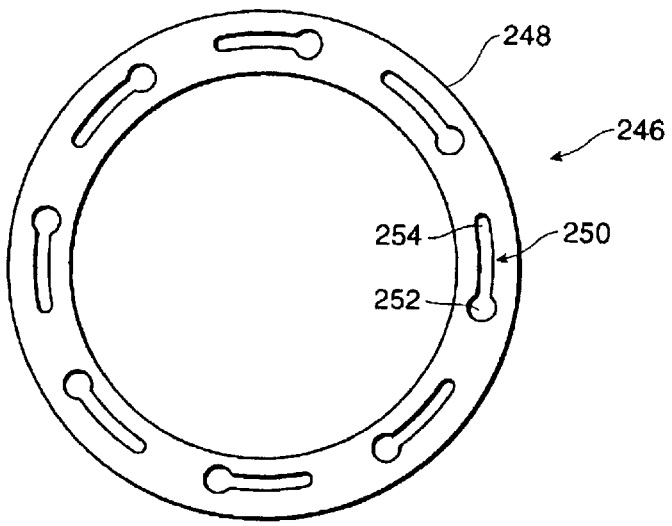
Figure 24:
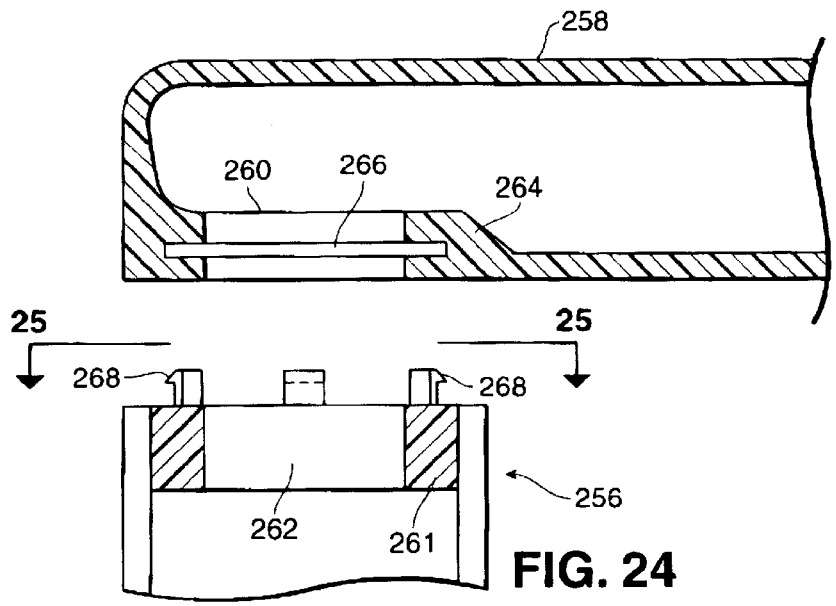
Figure 25:
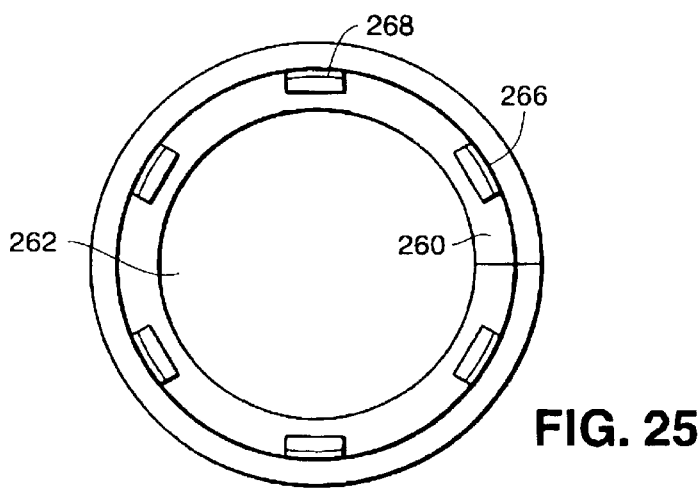
Figure 26:
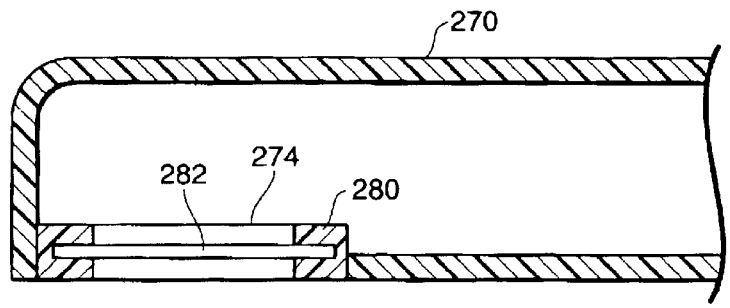
Figure 26:
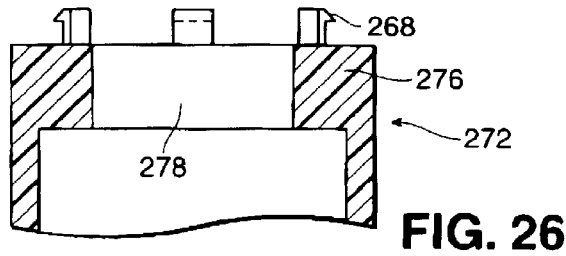
Figure 27:
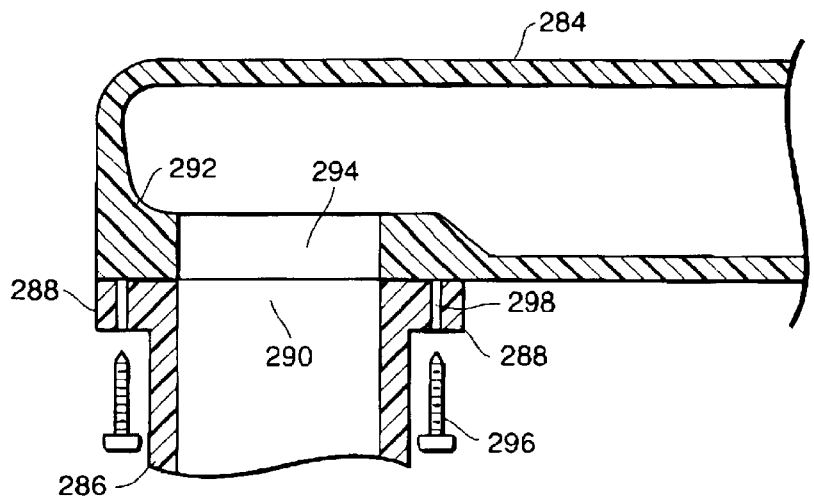
Figure 28:
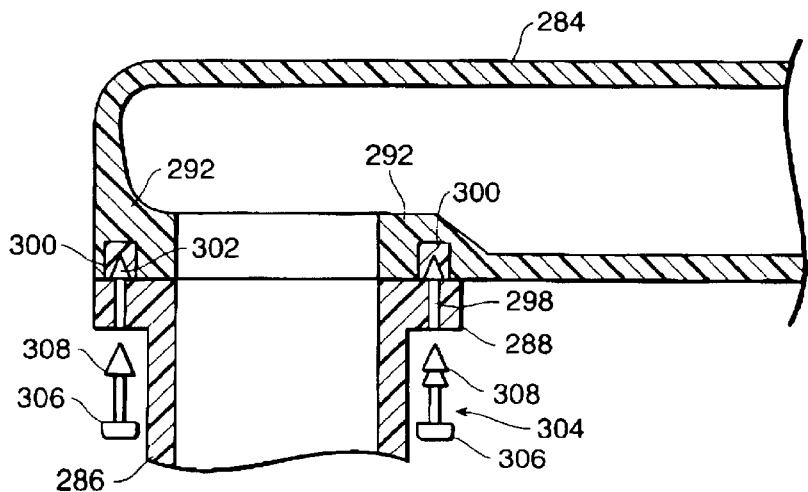
Figure 29:
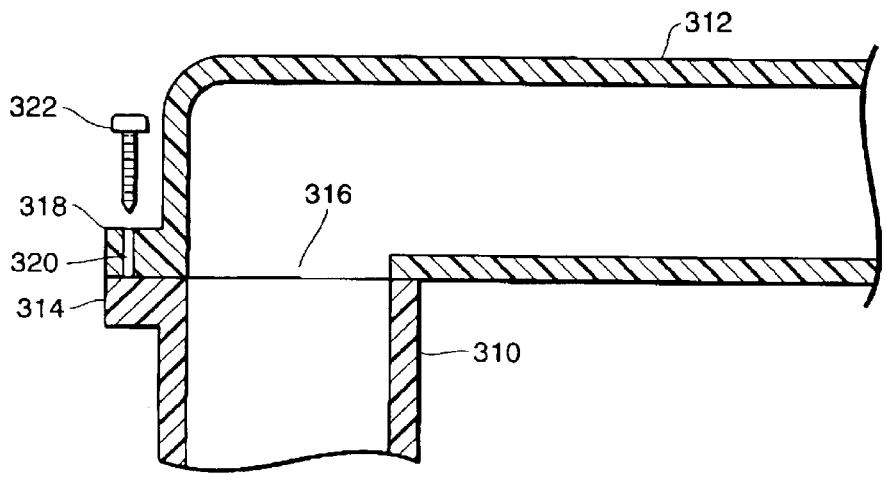
Figure 30:
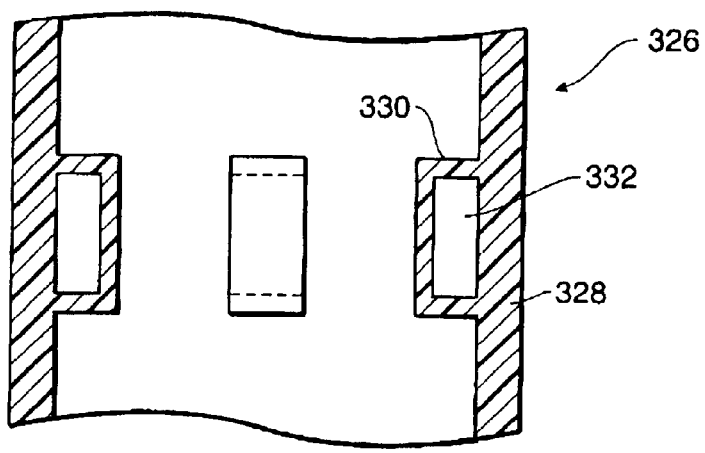
Figure 31:
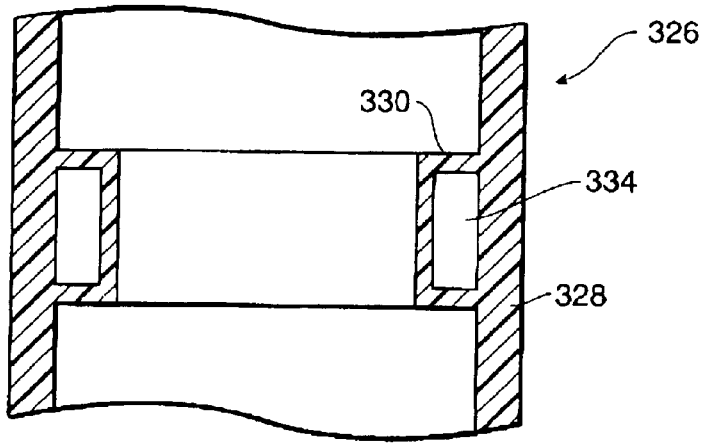
Figure 32:
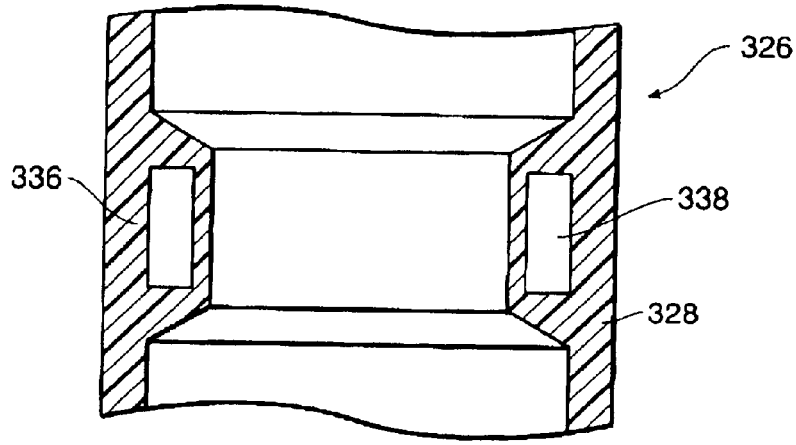
Figure 33:
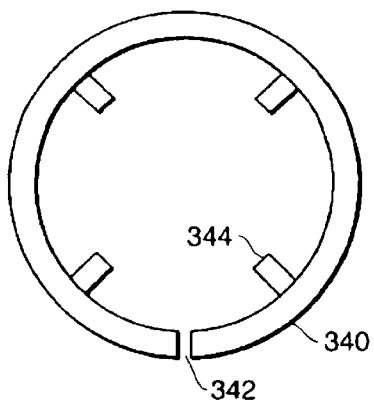
Figure 34:
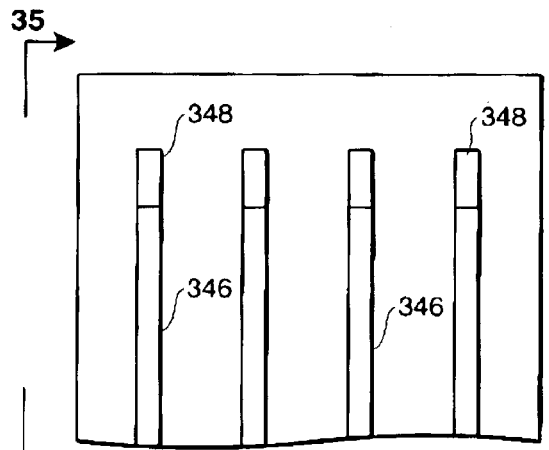
Figure 35:
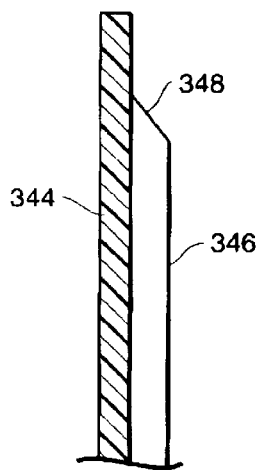
Figure 36:
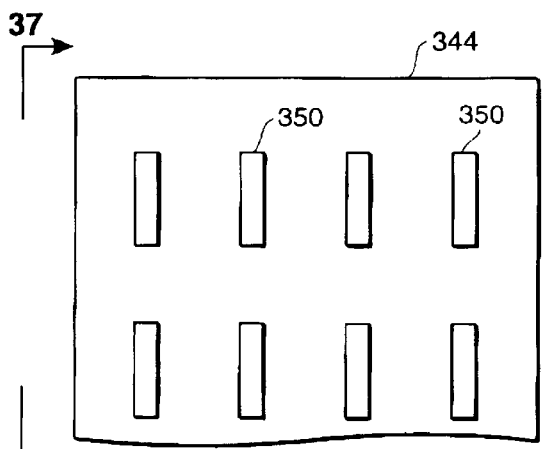
Figure 37:
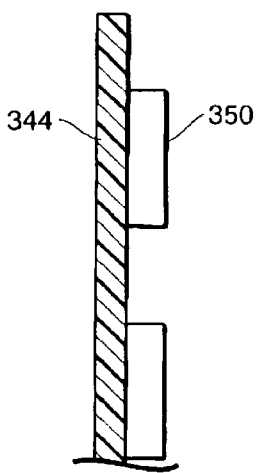
Figure 38:
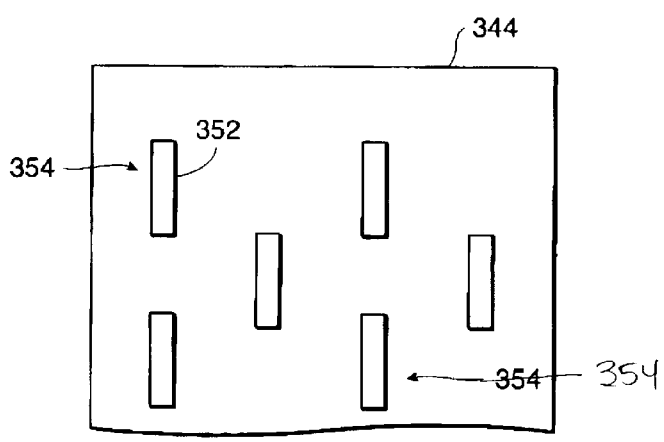
Figure 39:
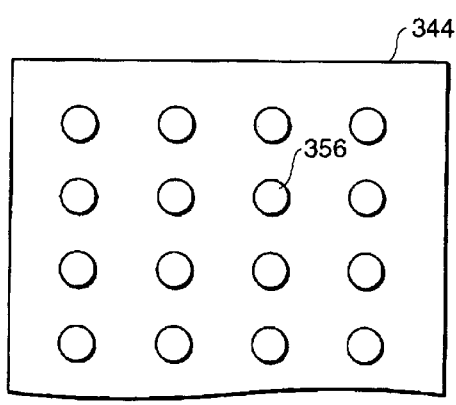
Figure 40:
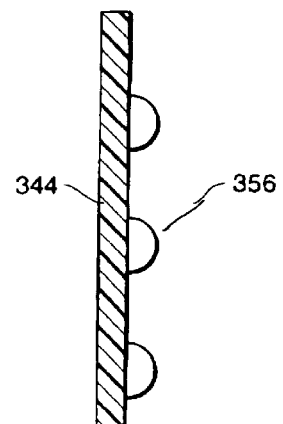
Figure 41:
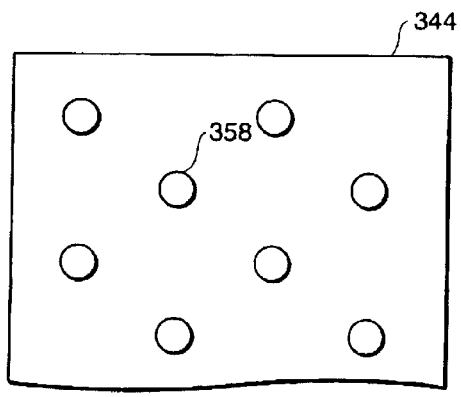
Figure 42:
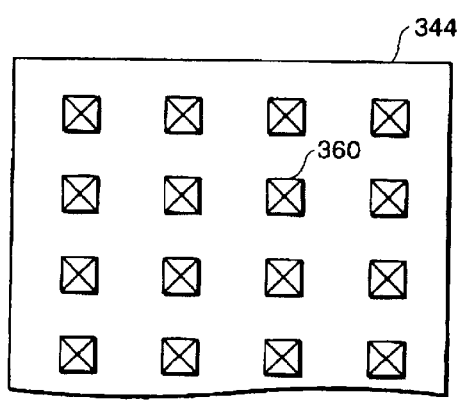
Figure 43:
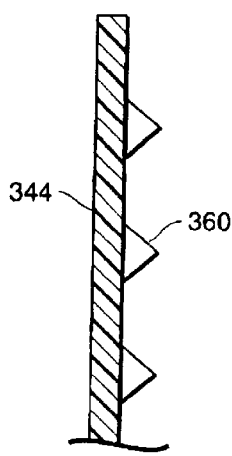
Figure 44:
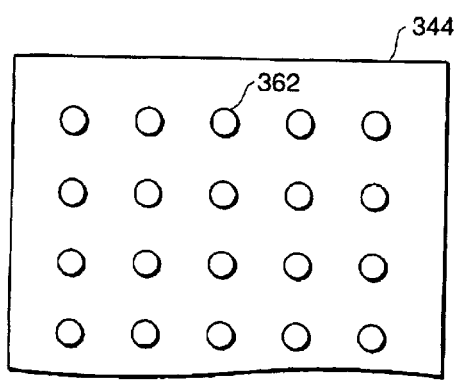
Figure 45:
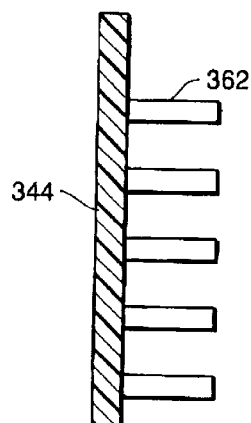
Figure 46:
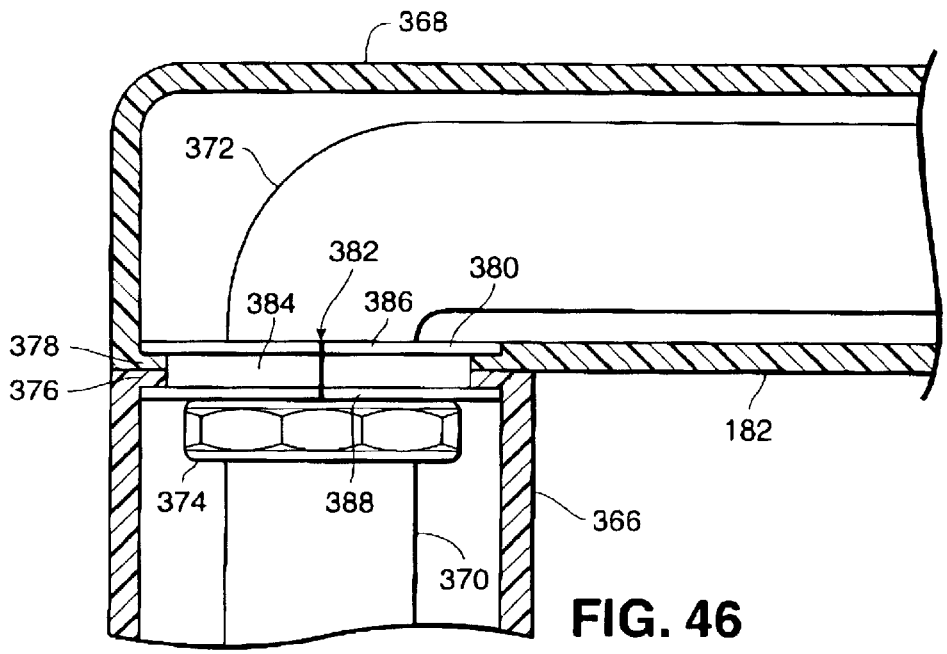
Figure 47:
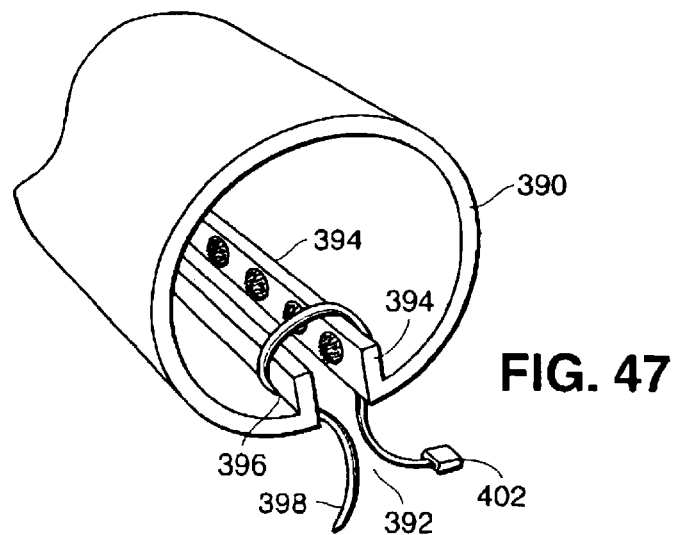
Figure 48:
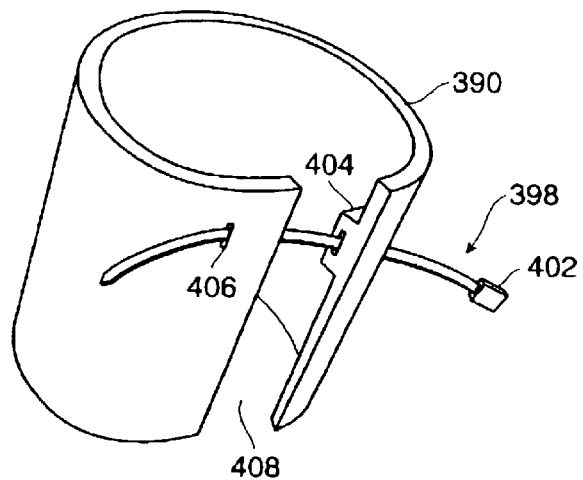
Figure 49:
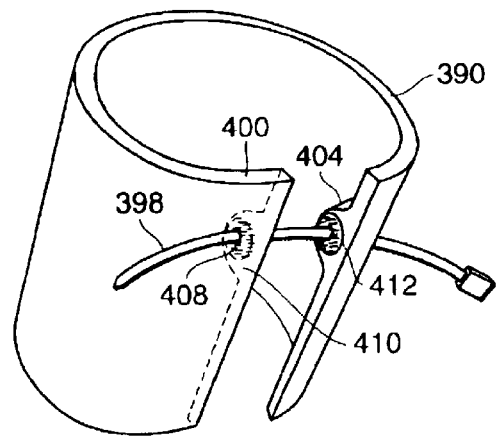
Figure 50:
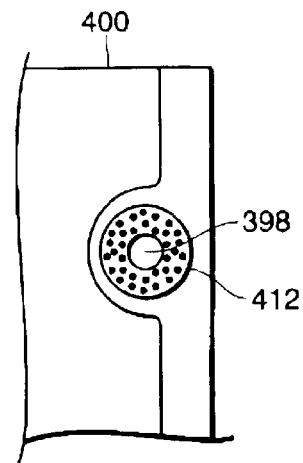
Figure 51:
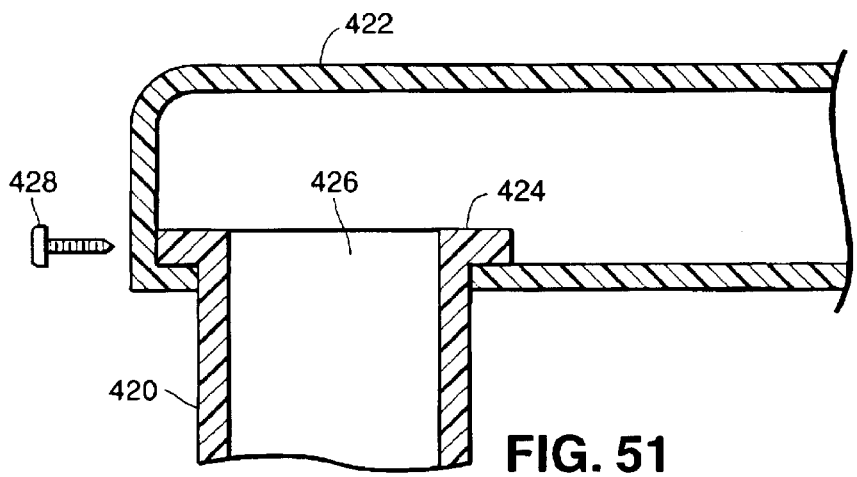
Figure 52:
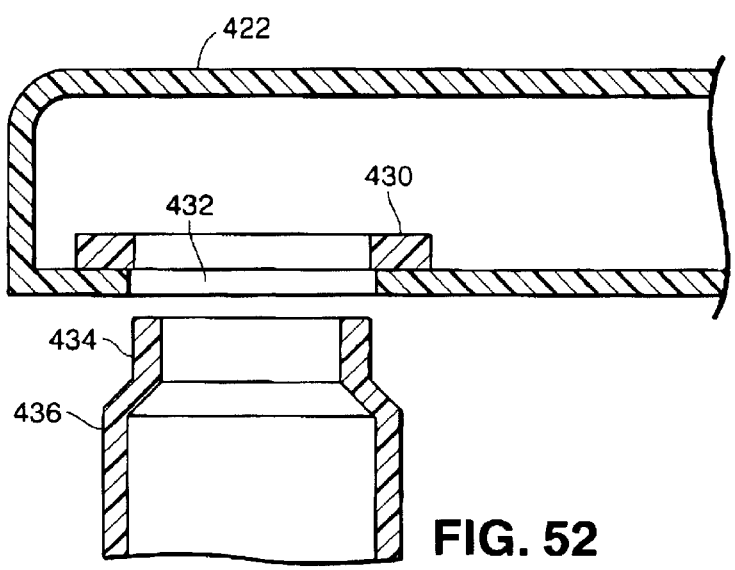
Figure 53:
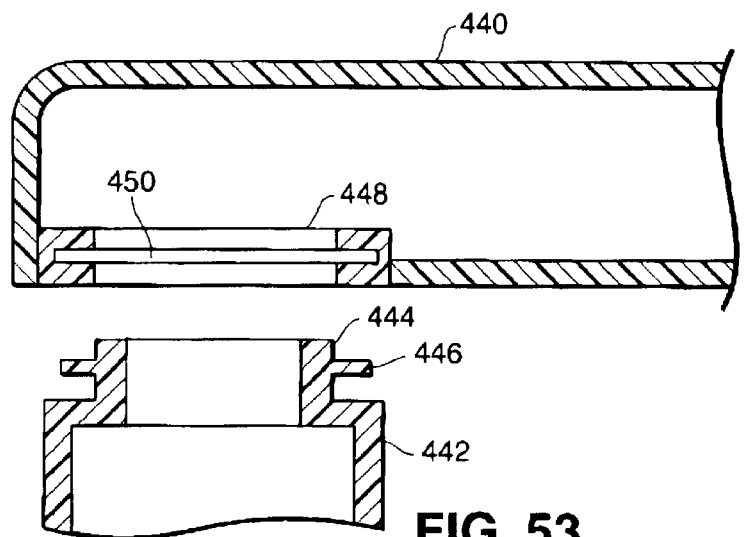
Figure 54:
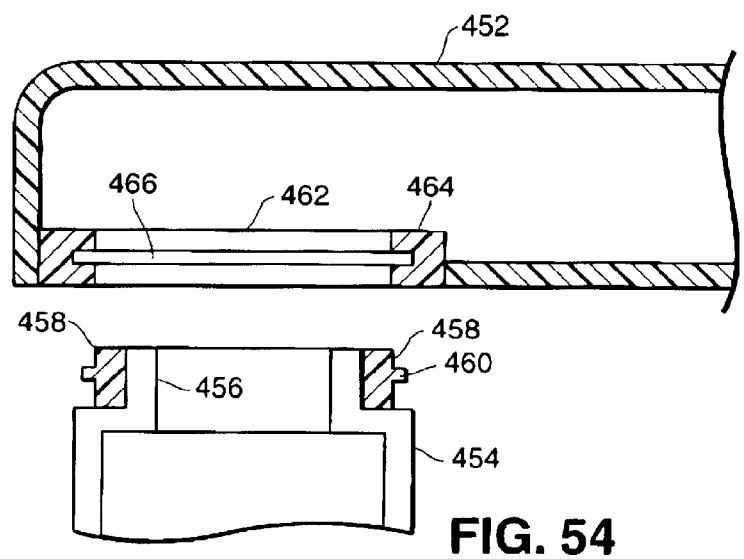
Figure 55:
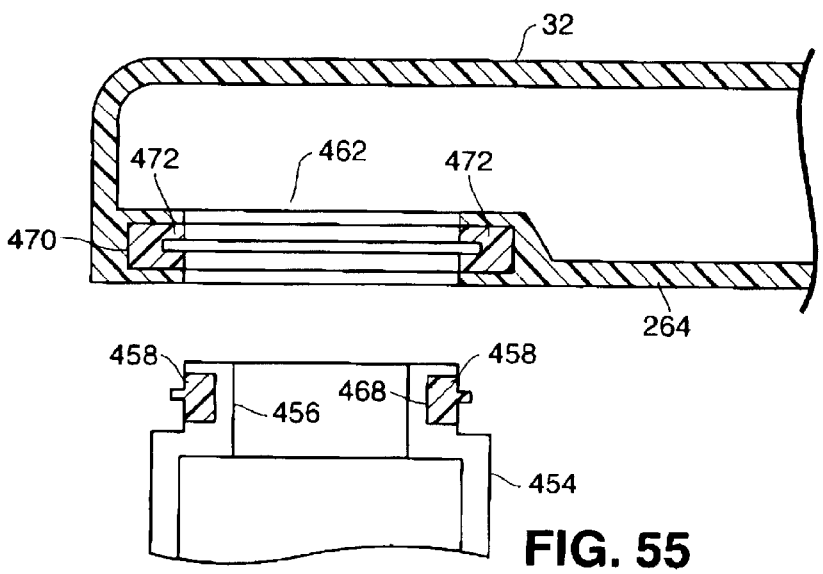
Figure 56:
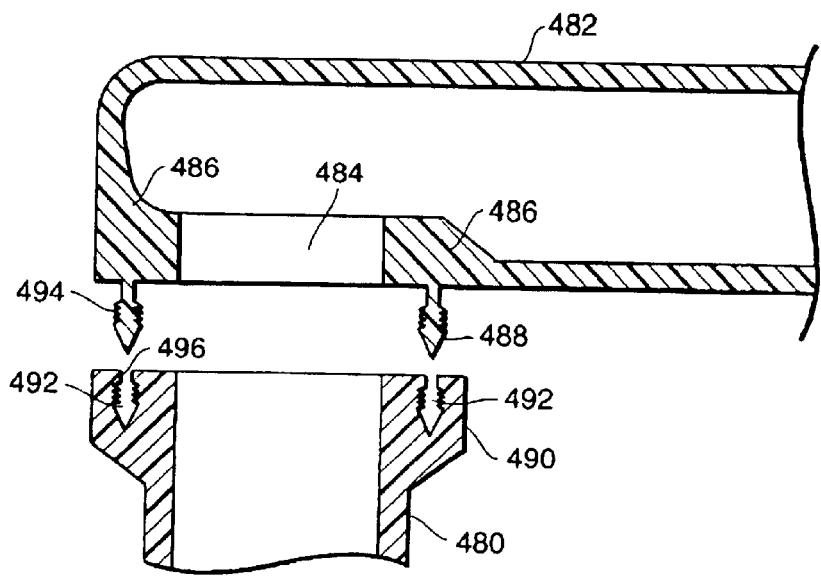
Figure 57:
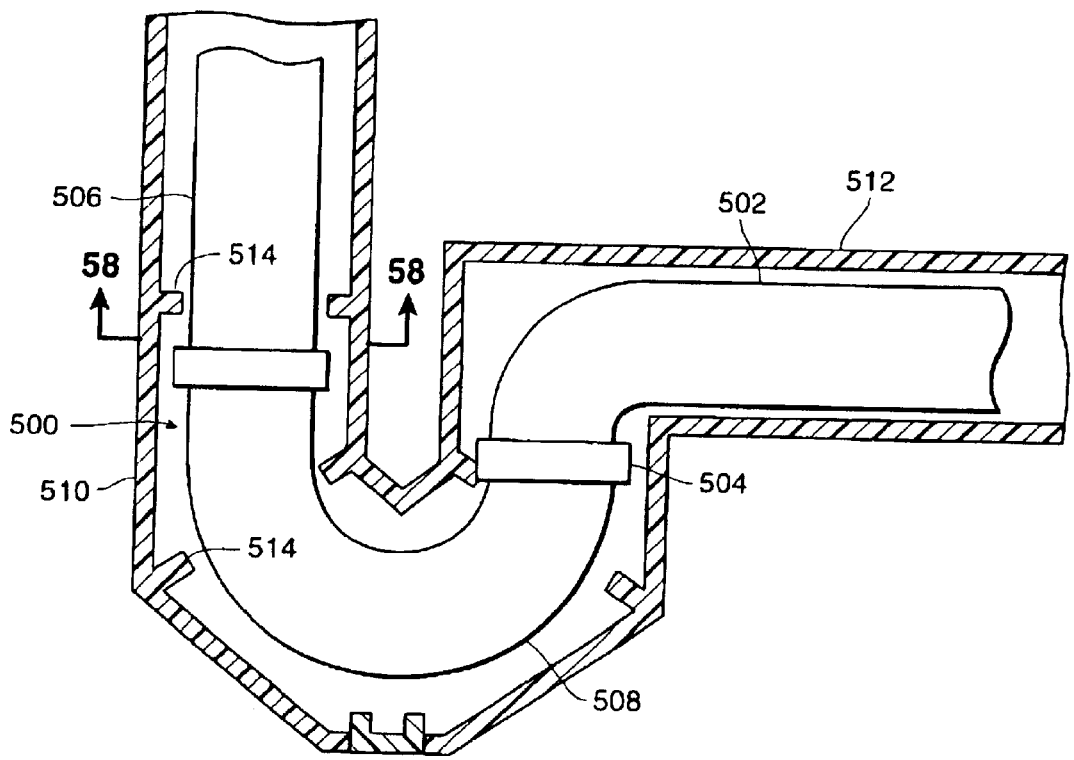
Figure 58:
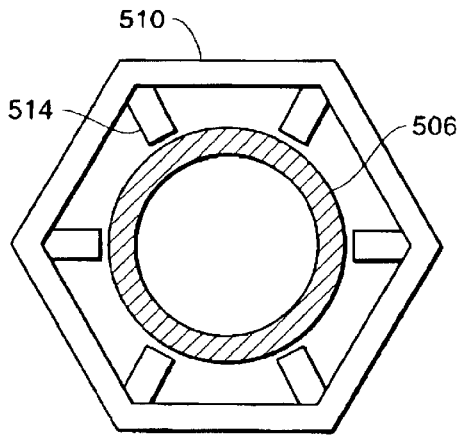
Figure 59:
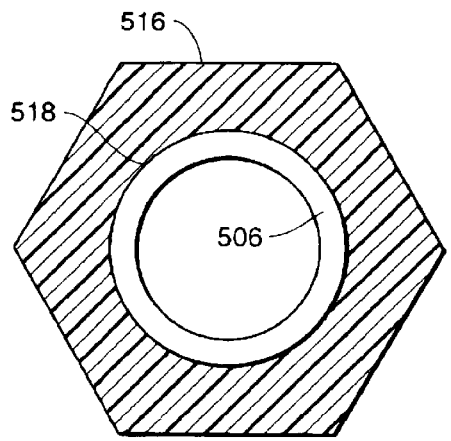
Figure 60:
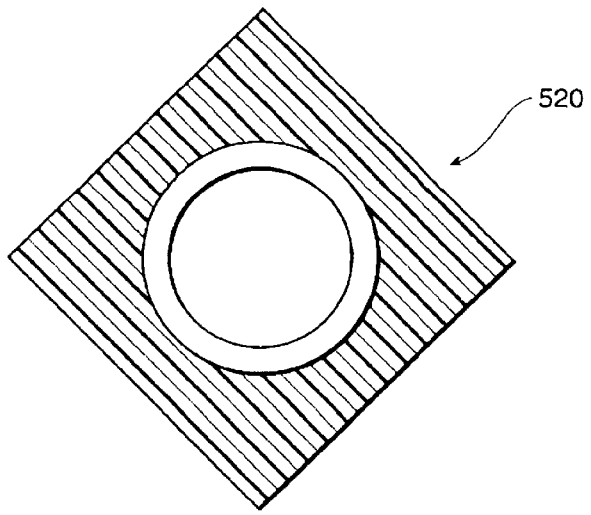
Figure 61:
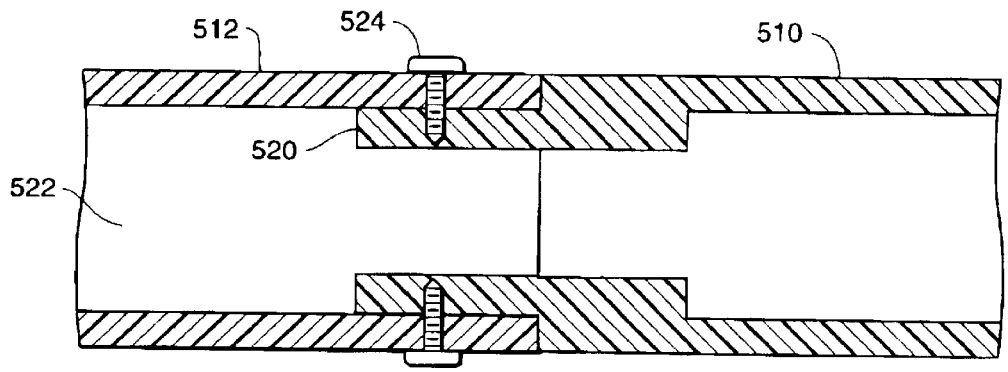
Figure 62:
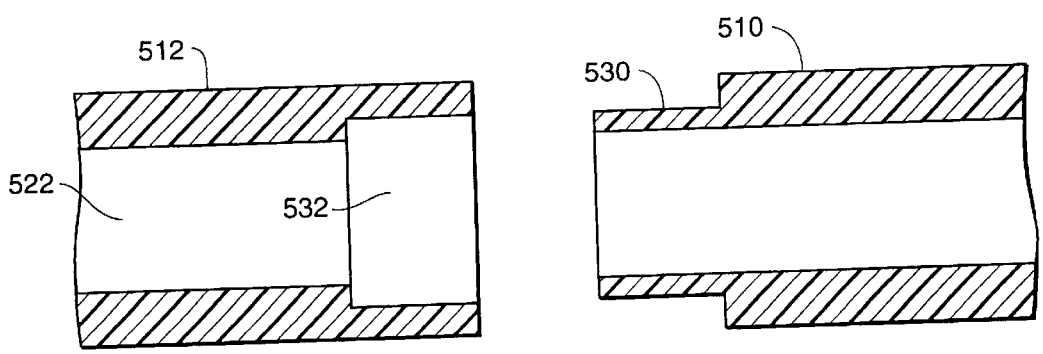
Figure 63:
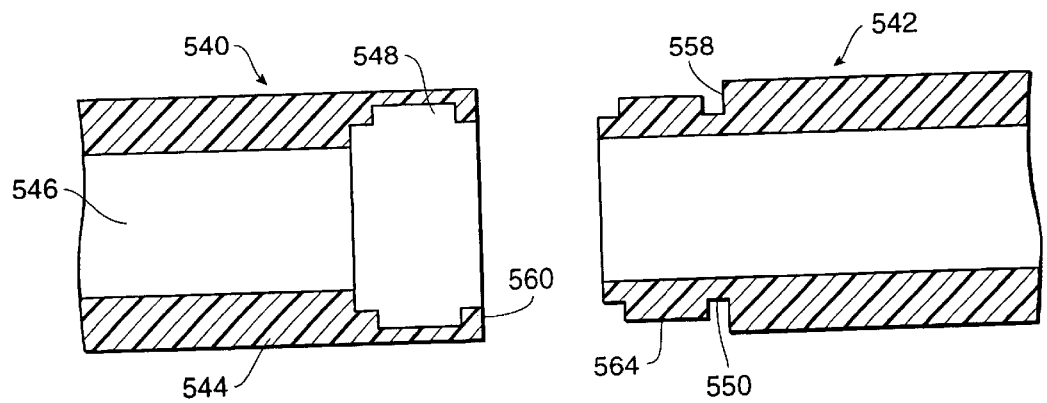

Having thus described the invention in general terms, reference will now be made to the accompanying drawings in which:

FIG. 1 is a fragmentary vertical sectional view of a pair of jacket sections in accordance with the present invention and their assembled position with respect to a P-trap pipe section and an L-shaped pipe section in an under-sink pipe installation;

FIG. 2 is a vertical sectional view taken along line 2—2 of FIG. 1 and showing the position of the inner surface of a jacket with respect to a pipe in a pipe installation;

FIG. 3 is a fragmentary perspective view showing an end of one of the jackets forming part of the pipe cover system of the invention and the means for locking portions of the jacket together along a longitudinal slit;

FIG. 3A is a fragmentary perspective view showing a modified means of securing two sections of a jacket together along a longitudinal slit;

FIG. 4 is a is a fragmentary horizontal plan view taken along line 4—4 of FIG. 1;

FIG. 5 is a horizontal sectional view taken along line 3—3 of FIG. 1;

FIG. 6 is a top plan view, similar to FIGS. 3 and 4, and showing the jacket in a locked and secured position about a pipe with edges of the longitudinal slit secured together;

FIG. 6A is an end elevational view of one pipe section, somewhat similar to FIG. 6, and showing an alternate means of locking the ends of a jacket around a pipe;

FIG. 7 is a fragmentary exploded vertical sectional view showing one means for locking an end of a J-shaped pipe cover with respect to relatively elongate cylindrically shaped pipe cover;

FIG. 8 is a fragmentary sectional view showing the two pipe cover sections of FIG. 7 in a locked position;

FIG. 9 is a fragmentary exploded vertical sectional view, similar to FIG. 7, and showing an alternate means for releasably locking an end of a J-shaped pipe cover to an elongate cylindrically shaped pipe cover;

FIG. 10 is a fragmentary exploded sectional view showing a further means for locking an end of a J-shaped pipe cover to an elongate cylindrically shaped pipe cover;

FIG. 11 is another fragmentary exploded vertical sectional view showing a further means for locking an end of a J-shaped pipe cover to an elongate cylindrically shaped pipe cover;

FIG. 12 is a further exploded fragmentary vertical sectional view showing a further means for locking an end of a J-shaped pipe cover to an elongate cylindrically shaped pipe cover;

FIG. 12A is a fragmentary plan view taken substantially along the plane of line 12A—12A of FIG. 12, and showing cable ties secured to the interior surface of the jacket;

FIG. 13 is a fragmentary exploded vertical sectional view, similar to FIG. 12, and showing another means for locking an end of a J-shaped pipe cover to an elongate cylindrically shaped pipe cover;

FIG. 14 is an exploded fragmentary vertical sectional view of still another modified form of means for locking an end of a J-shaped pipe cover to an elongate cylindrically shaped pipe cover;

FIG. 14A is an enlarged fragmentary sectional view showing end sections of two jackets of FIG. 14 abutted together;

FIG. 15 is a vertical sectional view of yet another modified form of means for locking an end of a J-shaped pipe cover to an elongate cylindrically shaped pipe cover;

FIG. 16 is a fragmentary vertical sectional view showing still another modified form of means for locking an end of a J-shaped pipe cover to an elongate cylindrically shaped pipe cover;

FIG. 17 is an exploded fragmentary vertical exploded sectional view showing a modified form of means for locking an end of a J-shaped pipe cover to an elongate cylindrically shaped pipe cover;

FIG. 18 is an exploded fragmentary vertical sectional view, similar to FIGS. 14–17, and showing still a further means for locking an end of a J-shaped pipe cover to an elongate cylindrically shaped pipe cover;

FIG. 19 is an exploded fragmentary vertical sectional view showing another means for locking an end of a J-shaped pipe cover to an elongate cylindrically shaped pipe cover;

FIG. 20 is an exploded fragmentary vertical sectional view showing a modified form of means for locking an end of a J-shaped pipe cover to an elongate cylindrically shaped pipe cover;

FIG. 21 is a fragmentary vertical sectional view, similar to FIG. 20, and showing the J-shaped pipe cover and elongate cylindrically shaped pipe cover of FIG. 20 in a locked position;

FIG. 22 is a horizontal plan view of a locking disk which can be used for securing a J-shaped pipe cover to a straight pipe cover, in accordance with the present invention;

FIG. 23 is a plan view of an alternate form of locking disk which may be used in accordance with the present invention;

FIG. 24 is a fragmentary exploded vertical sectional view showing a further means for locking an end of a J-shaped pipe cover to an elongate cylindrically shaped pipe cover;

FIG. 25 is a horizontal plan view taken substantially along the plane of line 25—25 of FIG. 24 and showing the ends of the hooks of FIG. 24 extending through a locking disk;

FIG. 26 is a fragmentary exploded vertical sectional view showing still a further modified means for locking an end of a J-shaped pipe cover to an end of a cylindrically shaped pipe cover using a locking disk;

FIG. 27 is a fragmentary vertical sectional view showing still a further modified means for locking an end of a J-shaped pipe cover to an end of a cylindrically shaped pipe cover;

FIG. 28 is a fragmentary vertical sectional view showing still a further modified means for locking an end of a J-shaped pipe cover to an end of a cylindrically shaped pipe cover;

FIG. 29 is a fragmentary vertical sectional view showing still another means for locking an end of a J-shaped pipe cover to an end of a cylindrically shaped pipe cover;

FIG. 30 is a fragmentary sectional view showing loops on the interior of a pipe cover for receiving a flexible fastener strip to be extended therethrough;

FIG. 31 is a vertical sectional view, similar to FIG. 30, and showing a slightly modified form of loop arrangement for receiving a flexible retaining strip;

FIG. 32 is a further fragmentary vertical sections view, similar to FIGS. 30 and 31, and showing still another means for forming loops in a wall of a pipe cover for receiving a flexible retaining strip;

FIG. 33 is a top plan view of a pipe cover showing means for spacing the cover from a pipe upon which the cover is disposed;

FIG. 34 is a fragmentary vertical sectional view showing an arrangement of spacers of the type used in FIG. 33 and taken through an edge of the pipe cover section illustrated in FIG. 33;

FIG. 35 is a vertical sectional view, taken along line 36—36 of FIG. 35, and the ribs on the interior of an opened pipe cover in accordance with the present invention;

FIG. 36 is a fragmentary vertical plan view showing a modified form of ribs on the side wall of an opened cover;

FIG. 37 is a fragmentary sectional view taken substantially along the plane of line 37—37 of FIG. 36 and showing modified ribs;

FIG. 38 is a fragmentary vertical sectional view, similar to FIG. 36, and showing a modified form of rib pattern using the ribs of FIG. 37 on the interior surface of an opened pipe cover;

FIG. 39 is a fragmentary vertical plan view of an opened pipe cover showing button-like spacers on the interior surface for spacing from a pipe covered thereby;

FIG. 40 is a fragmentary vertical sectional view showing the view of the button-like spacer arrangement of FIG. 39 from a side;

FIG. 41 is a fragmentary vertical plan view, similar to FIG. 39, and showing a modified form of spacing of the button-like spacers of FIG. 39;

FIG. 42 is a fragmentary plan view, similar to FIG. 41, and showing diamond shaped projections for spacing the cover from a pipe covered thereby;

FIG. 43 is a vertical sectional view showing the cover of FIG. 42 in side elevation;

FIG. 44 is a fragmentary plan view showing still an alternate form of rod like projections for spacing a cover from a pipe covered thereby;

FIG. 45 is a fragmentary sectional view showing the rods of FIG. 44 in side elevation and taken substantially along the plane of line 45—45 of FIG. 44;

FIG. 46 is a fragmentary vertical sectional view, partially in side elevation, and showing a pair of pipe covers supported by a fitting on pipes covered by the covers of the invention;

FIG. 47 is a fragmentary perspective view showing one means for securing the ends of a longitudinal slit in the pipe cover of the invention using ties therefore;

FIG. 48 is a fragmentary perspective view showing an alternate embodiment of using ties for securing a pipe cover about a pipe in accordance with the present invention;

FIG. 49 is a fragmentary perspective view also showing another modified form of pipe cover and the use of ties for securing the opposite sides of a longitudinal slit together to hold the pipe cover about a pipe;

FIG. 50 is a fragmentary side elevational view showing a portion of the pipe cover of FIG. 49;

FIG. 51 is a fragmentary sectional view showing another modified form of securing a J-shaped pipe cover to a straight pipe cover section;

FIG. 52 is a further fragmentary exploded sectional view showing another means for securing an end of a J-shaped pipe cover to an end of a straight pipe cover section in accordance with the present invention;

FIG. 53 is a fragmentary exploded vertical sectional view showing another means for securing an end of a J-shaped pipe cover to an end of a straight pipe cover section using a snap fit arrangement;

FIG. 54 is a fragmentary exploded vertical sectional view, similar to FIG. 53, and showing still another means for snap fitting an end of a J-shaped pipe cover to an end of a straight pipe cover;

FIG. 55 is a fragmentary exploded vertical sectional view, similar to FIGS. 53 and 54, and showing still another alternate means of securing an end of a J-shaped pipe cover to an end of a straight pipe cover section;

FIG. 56 is a fragmentary exploded vertical sectional view, similar to FIG. 55, and showing yet another modified form of securing an end of a J-shaped pipe cover to an end of a straight pipe cover;

FIG. 57 is a fragmentary vertical sectional view showing various components of a heat protective cover system of the invention which is of non-circular cross-sectional shape;

FIG. 58 is a sectional view, taken along line 58—58 of FIG. 57, and showing the heat protective cover of FIG. 57 disposed about a hot water pipe;

FIG. 59 is a cross-sectional view of an alternate embodiment of a non-circular pipe cover;

FIG. 60 is a cross-sectional view showing still another modified form of non-circular pipe cover in accordance with the present invention;

FIG. 61 is a fragmentary sectional view showing one end of a non-circular pipe cover forming part of the cover system of the invention and specifically showing a projecting locking flange thereon for securing at an adjacent pipe cover;

FIG. 62 is an exploded fragmentary sectional view showing the nesting of a pair of pipe cover sections which can be coupled together in accordance with the present invention; and FIG. 63 is an exploded fragmentary sectional view showing an alternate locking arrangement for locking one non-circular pipe cover to a next abutting pipe cover in accordance with the invention.

DETAILED DESCRIPTION OF PREFERRED EMBODIMENTS

Referring now in more detail and by reference characters to the drawings which illustrate practical embodiments of the present invention, FIG. 1 illustrates a conventional under-sink pipe arrangement in which there is provided a J-shaped pipe 20 and an L-shaped pipe 22, or so-called "waste pipe" or "waste arm pipe", connected to a short leg of the J-shaped pipe and secured thereto by a locking nut 24. This type of construction is conventional, as aforesaid, and is usually located to receive drain water from the sink and introduce same into a drain through a wall surface. The J-shaped pipe 20 may conventionally be comprised of straight pipe 26 connected at its lower end with a U-shaped pipe 28 with a nut 29. In either case, they form a J-shaped pipe arrangement.

In a conventional pipe installation, and particularly a P-trap installation under a sink, various combinations of pipe sections can be connected together, and in the connected arrangement constitute a pipe installation. Moreover, it is important to recognize that the waste arm 22 will usually extend outwardly from the J-trap in a plane generally parallel with the plane of the J-trap components. However, the waste arm, depending on the particular installation, could extend outwardly at an angle relative to the plane of the J-trap. Moreover, the J-trap comprises that portion including the straight leg 26 and the U-shaped bend 28. The waste pipe is sometimes referred to as an L-shaped pipe because of the shape of that pipe as shown in FIG. 1.

The pipe jackets hereinafter described may be formed in any of a number of conventional molding processes and formed of a variety of known plastic materials. One of the conventional highly effective materials of construction is polyvinyl chloride. Other materials which can be molded for this purpose include polypropylene and polymers of other lower alkyl resins. Moreover, these various jackets may be formed in various molding operations, as aforesaid, such as injection molding, blow molding, or the like. In addition, and if desired, the various jackets can be formed of reinforced plastic composite materials, such as carbon-epoxy resin composites. The injection molded plastics are preferred, since they provide some degree of flexibility and yet are still sufficiently tough and durable. It is preferable to use jackets having at least one-fourth inch thickness in order to provide sufficient heat insulation with respect to any hot water pipes. However, the various thicknesses and sizes of the materials can vary depending upon the actual design requirements.

The cover system of the present invention includes a number of components and only two of which are more fully illustrated in FIG. 1 and include a first pipe cover 30, which is generally of a J-shape, and a straight pipe cover section 32 and both of which are generally cylindrical in cross-section.

The pipe covers of the invention are not designed to snugly engage the pipe as in many conventional prior art constructions, but are adapted to loosely receive the pipes. In this way, installation is much easier and the air space between the pipes and the walls of the covers or jackets serves an insulator. Fins or like elements, located on the inner surface of the jackets, may also aid in locating the jackets in spaced apart relationship from the surfaces of the pipes, as hereinafter described in more detail.

In a preferred embodiment, the inner surface of each of the jackets may be provided with finger-like projections, as shown in FIG. 18, or otherwise with short rounded protrusions, such as so-called "buttons", on the inner surface of the jackets, as best shown in FIGS. 18–29.

It has been found that pipe cover appearance is an important factor in pipe jackets and, hence, the relatively smooth outer surface, which avoids the need for sockets and like structure to s accommodate couplings, such as the nut 24, are preferred. The jackets in accordance with the present invention have a generally smooth outer surface and avoid the need for bulges and like structure which are unsightly and deter from the appearance thereof.

Each of the jackets which form part of the present invention and, particularly, the first J-shaped jacket 30 and the second or straight jacket 32, are longitudinally slit over a portion of their length so that they may be spread apart and envelopingly disposed about the somewhat similarly configured pipe sections. In the embodiment as illustrated, the first jacket 30 is J-shaped and extends completely over the J-shaped pipe 20 as well as the short leg of the L-shaped pipe 22, as best shown in FIG. 1.

The straight or second pipe cover jacket 32 is provided with a straight cylindrical section 34 and which extends over the elongate portion of the waste arm 22 and a very short section of the L-shaped portion of the waste arm 22, also as best shown in FIG. 1.

The straight or second pipe cover jacket 32 is provided at its left-hand end, reference being made to FIG. 1, with an enlarged opening 36 to receive an end 38 of the J-shaped jacket 30, also as best shown in FIG. 1. The end 38 may abut against the pipe section forming the opening 36 or otherwise it may extend into the opening, as hereinafter described, and may be secured thereto, also in a manner as hereinafter described.

In the embodiment of the invention as illustrated in FIGS. 1 and 2, the opening 36 is located in a position closely adjacent to, but not necessarily at the end, of the straight jacket. However, it should be recognized and as also described hereinafter, that the opening 36 could be literally located at the very end of the jacket.

Each of the jackets, such as the first jacket 30 and the second jacket 32, are longitudinally slit over their length or at least a portion of their length and are capable of being spread apart to envelopingly fit about a particular pipe section, as aforesaid. The first cover or jacket 30 is disposed about a portion of the complete J-shaped pipe 20 and also a portion of the short leg of L-shaped pipe 22. Each jacket is therefore provided with a longitudinal slit 40, as shown in FIGS. 3 and 4. The edges of the jacket adjacent this longitudinal slit 40 are turned inwardly in the form of inwardly struck flanges 42. Each of these flanges are provided on their opposed faces with strips of fiber fasteners 44, such as so-called "Velcro" fasteners.

In accordance with the above-identified construction of the type, as shown in FIGS. 3 and 4, the opposed inwardly struck flanges 42 are then brought together after the jacket has been disposed about the pipe section and secured to one another. In this way, installation involving the use of screws or fasteners is avoided and enables easy and convenient installation almost with one hand.

In an alternate embodiment of the invention, FIG. 3A shows the use of snaps 44a on the inside of the each of the opposed flanges 42 for releasably securing the portions of a jacket together along the longitudinal slit. It should also be recognized that other forms of fasteners for securing the two ends of the jacket together along the longitudinal slit 40 could be provided. Moreover, it should also be recognized that it is not necessary in all cases to use inwardly struck flanges 42. The ends or margins of the jacket along the longitudinal slit could be brought together in abutting relationship, and secured together in that relationship by means of clips or like fasteners.

In order to provide a more permanent form of securement, if desired, cable locks 50 or similar permanent fasteners may be provided. These cable locks 50 exist in the form of cooperating straps 52 and 54, as best shown in FIG. 5. The cable lock 50 comprises essentially a strap and the cable lock 54 is provided with a buckle 56 or like mechanism for receiving an end of the strap 52. When inserted through the buckle 56, the strap 52 becomes permanently locked therein. In this way, the entire pipe section becomes permanently secured to the jacket and is relatively vandal proof. In fact, it is only necessary to have one or two of these locks, in addition to the fiber fastener locks 44, in order to permanently secure the jackets to the pipes.

It is also possible to completely eliminate the use of the fiber fastener locks 44 as shown in FIG. 5. By using a sufficient number of cable locks, including the straps 52 and 54, the jacket can be permanently secured about the pipe in a relatively secure manner. Moreover, it should also be understood that in place of the fiber fastener strips 44, other types of fasteners could be used, as for example, the snaps 44a as shown in FIG. 3A.

It should also be recognized that the cable locks 50 are actually integrally formed in the interior of the jacket. This can be accomplished by inserting the cable ties into a mold as the jacket is being formed. Otherwise, they can be applied to the interior surface in any conventional manner. Nevertheless, the cable ties could be in the form of a continuous loop having ends constituting the cable ties 52 and 54.

FIG. 6 shows the straight jacket 32 disposed about a section of pipe. In this case, the straight jacket 32 is illustrated about a section of the pipe 22. FIG. 6A illustrates an embodiment of a jacket such as the jacket 32 which has opposed jacket ends 56, located at a longitudinal slit 58. In this case, each of the ends are provided with integrally formed lock housings 60. These lock housings 60 each have openings in order to receive a clip or similar fastener such as the clip 62 as shown in FIG. 6A. In this particular case, the clip has enlarged ends 64 which can be forced through the opening in the ends 60, so as to maintain a tight locking action.

As indicated previously, the first jacket 30 may have a portion extending into the opening 36 as shown in FIG. 1. For this purpose, the opening 36 may be formed at the end of the straight or second pipe cover or jacket 32. An alternate form of jacket arrangement is shown in FIG. 7 of the drawings with a J-shaped jacket 66, somewhat similar to the J-shaped jacket 30. In like manner, a straight jacket 68 is also operable with the jacket 66, and covers the waste arm while the jacket 66 covers the J-bend as well as a portion of the short leg of the waste arm 22.

The jacket 68 is similarly provided with an opening 70 at the end of the jacket. Moreover, it can be observed that the jacket 68 has an elongate relatively straight leg 72, and which carries that opening 70 at one end. Moreover, the jacket is provided with a thickened wall section 74 surrounding the opening 70, in order to provide a certain degree of structural integrity to the jacket. In addition, the J-shaped jacket 66 may be provided at the end of the shorter leg with an integrally formed, outwardly struck, cylindrically shaped diametrically reduced flange 76 and which is capable of fitting within the reduced diameter opening 70 formed in the jacket 68. This opening 70 is still sufficiently large to accommodate the pipe 20 or, for that matter, the pipe 22. In the embodiment as shown in FIG. 6, the coupling or locking nut 24 would be located beneath the area of securement of the two jackets together, as shown in FIG. 7. This type of interlocking arrangement is highly effective and the outwardly struck flange 76 can be snugly and frictionally retained within the opening 70.

A slightly modified form of locking mechanism 78 is illustrated in FIG. 9 of the drawings and provides for the fiber fastening strip 80 on the exterior surface of the outwardly struck flange 76 and a mating fiber fastening strip 82 on the inner surface of the opening 70 in the region of the joinder. In this way, when the end of the jacket 66 is abutted against the end of the straight jacket 68, the two mating fiber fastening sections 80 and 82 will tightly hold the two jackets together.

The locking arrangement as shown in FIGS. 7 and 8 also shows the use of one or more screws 78 for securing the straight jacket 68 to the J-shaped jacket 66. In many cases, one screw 78 is sufficient to retentively hold the two jacket sections together. In like manner, use of a simple adhesive around the edge of the flange 76, or around the inner edge of the jacket forming the opening 70, could be employed in order to adhesively secure the two jackets together.

FIG. 10 illustrates a modified form of locking mechanism for releasably locking two jackets together, as for example, the straight jacket 68 disposed over a waste pipe, as well as with a modified form of J-trap jacket 84. In this case, the J-trap jacket 84 is similar to the J-trap jacket 66 of FIG. 9, except that the J-shaped jacket 84 ends with an opening 86 of the same diameter as the remainder of the J-trap jacket 84. In place of the flange 76 on the jacket 66, the modified jacket 84 employs a ring or disk 88 inserted in the opening 86 and retentively held therein by means of set screws 90. Again, other means of holding the disk 88 in place could be employed, as for example, adhesives or the like.

In this case, the disk 88 is similarly provided with an opening 92 in order to receive a pipe of the pipe installation, as for example, the short leg of the waste pipe. Furthermore, the disk is provided with an integrally formed outwardly struck diametrally reduced flange 94, capable of retentively fitting within the opening 70. Again, depending upon the construction of the pipe arrangement, it may not be absolutely necessary to physically lock the straight pipe jacket 68 to the jacket 84. In this case, if the end of the jacket 84 tightly abuts against the jacket 68, the pipe sections themselves will hold the jacket pieces together. However, and as indicted above, other means for securing the flange 94 within the opening 70 may be employed.

FIG. 11 illustrates a slightly modified form of the invention, which again uses the J-trap jacket 84 and a modified form of straight jacket 96 similar to the jacket 68. However, in this case, the jacket 96 is provided with an opening 98 without a reduced or thickened wall section at the edge of the opening. Rather, the jacket 96 is provided with a disk 100, having an opening 102, to receive a pipe of the pipe installation. If desired, set screws 104 can be used for locking the disk 88 in place and in like manner, set screws 106 can be used for locking the disk 100 in place in the opening 98 of the jacket 96.

In the embodiment as shown in FIG. 11, the flange 94 will snugly fit within the opening 102 of the disk 100. If desired, any means to secure the flange within the opening 102 can be used. It can also be observed that the screw type attachment as shown in FIGS. 10 and 11, is used in place of the fiber fastening strip attachment of FIG. 9 and can be used in conjunction therewith, as well. Moreover, it should also be recognized that although only a few set screws are shown in FIG. 11, that a plurality of such screws could be spaced around the various components in order to tightly secure the same together.

The various disks such as the disk 88 in the embodiment of FIG. 10, and the disk 100 in the embodiment of FIG. 11 could be suitably formed of any relatively rigid plastic material, which has fair structural integrity and will hold its rigidity. Moreover, this type of plastic material should be capable of threadedly receiving a set screw of the type shown in FIGS. 10 and 11. This type of disk can be conveniently and easily injection molded or otherwise formed in other molding techniques.

FIG. 12 illustrates another modified form of locking mechanism 110 for releasably locking a J-trap pipe cover or jacket 112 to a waste arm or second pipe cover or jacket 114. In this case, the locking mechanism 110 does not provide for insertion of any component of the first jacket 112 into the second jacket 114. Rather, the first jacket 112 merely abuts against the second jacket 114 adjacent an opening 110, in the manner as shown in FIG. 12. For this purpose, the locking mechanism 110 is provided with a fiber fastening strip 116 on the upper surface of the short leg 118 of the J-trap jacket 112 and a mating fiber fastening strip 120 on the downwardly presented surface of the jacket surrounding an opening 122, formed in an end of the straight cylindrically shaped jacket 114. In this way, when the J-trap jacket 12 is abutted against the waste arm jacket 114 adjacent the opening 122, the two jackets 112 and 114 will releasably lock together.

Each of the jackets, as for example, the jacket 112 and 114 in FIG. 12, are longitudinally slit and provide a slit opening 124 as shown in FIG. 12A. In this case, molded on the inside of the jacket adjacent the longitudinal slit is a first strip 126 containing a cable tie 128, having a buckle 130 at the end thereof. In like manner, another strip 132 is secured to the interior surface of the opposite side of the jacket adjacent the slit 124, and carries another cable tie in the form of a strap 134. In this way, each of the jackets can be securely and retentively held together on the various pipe sections about which they are disposed. Thus, the fiber fastening strips 116 and 120 are typically more than sufficient to hold the various jackets together on the pipe installation.

FIG. 13 illustrates a locking mechanism 138 similar to that illustrated in FIG. 12. In this case, however, a relatively hard rubber or plastic ring 140 is fitted onto the upper end of the short leg of the J-shaped or J-trap pipe cover 112. This ring 140 carries a fiber fastening strip 142 and again mates with a similar fiber fastening strip 120 on the underside of straight pipe cover 114, surrounding the opening 112, all as best shown in FIG. 13 of the drawings.

FIG. 14 illustrates an embodiment of the invention in which there is provided still another locking mechanism 144 for securing an end of a J-shaped or J-trap 146 and, particularly, the short leg thereof, to an end of a straight pipe waste arm jacket 148. The jackets 146 and 148 are similar to the corresponding J-trap jackets and the waste arm jackets previously described and illustrated. However, and in this case, the J-trap jacket is provided in the short leg 150 thereof, with an end portion of increased wall thickness 152, as best shown in FIG. 14. Moreover, the end portion 152 is similarly provided with an opening 154 for receiving a pipe covered by the J-trap cover. In like manner, the waste arm cover is also a straight member and cylindrically shaped, as are the previously described waste arm covers. In this case, the J-trap cover 146 has, in the short leg 150 thereof, an end section of increased wall thickness 152, as best shown in FIG. 14. Moreover, that end section 152 similarly has an opening 154 sufficiently sized to receive a pipe of a pipe installation extending through the cover 146.

The waste arm jacket 148 is similarly provided with an opening 156 adjacent an end thereof, and which is also surrounded by a section of the jacket 158 of increased wall thickness, also as best shown in FIG. 14. In this case, the end 152 of increased wall thickness and the region 158 of increased wall thickness in the waste arm jacket 148, have essentially the same size.

The end section 152 is provided with a series of recesses and in this case, arrow type recesses 160. In like manner, the end section 158 of the jacket 148 is provided with recesses 162. Moreover, these recesses are designed to receive clips 164 of the type also shown in FIG. 14. The clips 164 each have enlarged ends 166, which can be forced into the respective recesses 160 and 162. FIG. 14A presents an enlarged sectional view showing the region of the enlarged end section 158 and the end section 152. In this case, it can be observed that the arrow ends 166 can be forced into the respective recesses and become lodged therein by tight frictional engagement. The material forming the jacket is sufficiently elastic so as to receive the arrow ends and thereby physically and retentively hold the ends of the arrows, and thereby hold the two jackets together.

FIG. 15 illustrates a modified form of locking mechanism 170 used with a J-trap cover 172 and a waste arm cover 174. In this case, the waste arm cover has an opening 176 receiving a relatively hard rigid disk 178. Moreover, the upper end of the J-trap cover 172 is similarly provided with a relatively rigid disk 180 matching the disk 178. The disk 180 similarly has an enlarged opening 182 effectively matching the opening 176. The disk 180 is located in a direction transverse to the longitudinal axis of the short leg of the jacket 172. In like manner, the disk or plate 178 is similarly located surrounding an end of the opening 176. These inserts may be tightly fitted within the ends of the respective jackets, or otherwise they may be molded into the ends of the jackets. Further, they can be secured within the respective ends of the jackets by means of a suitable adhesive or the like.

For purposes of locking the end of the J-shaped jacket 172 to the jacket 174 at the openings 176 and 178, the plate 178 may be provided with small arrow shaped apertures or openings 182 on its lower surface facing the opening 182. In like manner, the upper face of the plate 180 at the opening is similarly provided with apertures 184. These apertures 182 and 184 are sized to receive locking pins or so-called "clips" 186 which have a straight shank and arrow shaped ends similar to the clips 164, as shown.

The clips 164 have arrow shaped ends, as aforesaid, and these ends 166 have opposed shoulders. In accordance with this construction, the pins can be inserted into the apertures 182 before the jacket 172 is abutted against the jacket 174. The pins 164 will thereupon become aligned with and forced into the opening 82. The arrow shaped ends 90 causes the pins to be tightly held within the respective openings and thereby retentively lock the two pipe jackets together. If desired, the openings 184 and, for that matter, the openings 182 could be provided with opposed abutment faces on the inner portions of the apertures in order to allow the shoulders of the ends 166 to engage these abutment surfaces and thereby provide a further locking action.

FIG. 16 illustrates an embodiment in which only one plate 180 is used in the J-shaped pipe cover and the end of the straight pipe cover is provided with a thickened wall section 186 surrounding the opening 176. This thickened wall section 186 is similarly provided with arrow shaped recesses 188 adapted to receive the ends of the pins 164. Thus, and in this case, it can be observed that either a ring or plate 178 can be used at the end of the waste arm cover or otherwise, openings for receiving locking pins could be formed in a thickened wall section of the cover, as shown in FIG. 16. In either case, those locking pins illustrated in FIGS. 14 and 15 would also be used in this embodiment of the invention.

FIG. 17 illustrates an embodiment of a locking mechanism similar to that shown in FIG. 14. However, in this case, a fiber fastening layer 190 and a similar mating layer 192 are employed in addition to the locking pins. Thus, the user in this embodiment has the option of using either or both of the locking mechanisms.

FIG. 18 illustrates a modified form of locking mechanism 200 used in a J-shaped pipe cover 202 and a waste arm pipe cover 204. In this case, the pipe cover 204 is provided with a thickened end 206 surrounding an opening 208. This thickened is provided with recesses 210 sized to receive a locking pin 212, as hereinafter described.

The J-trap pipe section 202 is provided with a plate 214 at its upper end of the short leg thereof, as shown in FIG. 18, and which plate is provided with upstanding pins 216 facing the openings 210. In this case, it can be observed that the openings 210 have a size and shape similar to that of the pins 216.

When the jackets 202 and 204 are brought together, the locking pins 216 can be forced into the openings 210. Since the jacket material is somewhat pliable and elastic, it will allow forcing of the pins 216 into these recesses whereupon the enlarged heads 218 of each of these pins will be received in the enlarged portion of the recess 210. This type of mechanism also creates a positive locking action.

FIG. 19 illustrates a locking mechanism 220 which is similar to that used in FIG. 18. In this case, the waste arm cover 204 is identical. However, the waste arm cover 202 is also provided with a thickened end 222 at the upper end of the short leg thereof, and which is also again provided with the locking pins 216. These two jackets 202 and 204 of FIG. 19 also lock together in the same manner.

FIG. 20 illustrates a further embodiment, similar to that shown in FIG. 18. In this case, the waste arm jacket 204 is provided with a plate 226 inserted into the opening 208 and which carries the recesses 210 therein. Otherwise, the locking mechanism of FIG. 20 is similar to that shown in FIGS. 18 and 19.

These locking protrusions or pins 216 and the corresponding openings 210 are somewhat anchor-shaped, that is, they are provided with shanks and diametrically enlarged heads. However, due to the somewhat resilient nature of the material used in the formation of the jacket, these locking members and, particularly, the enlarged heads, will force the openings apart and allow the heads to become inserted into the openings and into enlarged sections thereon in the openings, as aforesaid. This type of locking action allows for a tight fitting action of the locking members into the openings and thereby provides for a tight fitting connection between the two jackets.

There is also some tolerance or so-called "play" for rotation of the waste arm jacket relative to the J-trap jacket. For that matter, if the waste arm pipe section 22 should be located at an angle relative to the plane of the J-shaped jacket, the large number of openings in the locking mechanisms, as well as the material of construction, allows some torquing so as to enable the various jackets to be locked in a desired angular rotation. Moreover, the provision of a large number of openings and corresponding locking pins, also provides for the desired orientation of one jacket relative to the other.

FIG. 21 discloses an embodiment somewhat similar to that illustrated in FIG. 20, and also includes the same waste arm cover 204 and the same J-trap cover 202. Moreover, a hard disk or plate 230 is inserted into the open upper end of the short leg of the J-trap cover 202, in the manner as shown in FIG. 21. Inserted into an opening 208 at the straight waste-arm pipe cover 204 is another plate 232. In this case, pins 234 similar to the pins 216 are mounted on the plate 230. The pins can also be forced through small openings 236 in the plate 232. The enlarged heads of these pins can be forced through the opening where the opening will then resiliently close around the shank of the pins and lock the enlarged heads on the upper end thereof. This type of locking means is also found to be highly effective.

In many of the previously described embodiments of the invention, it can be seen that disks or plates are inserted into the open upper end of the short leg of the J-trap cover or otherwise, the opening adjacent the end of the waste arm pipe cover. These plates included openings sized to receive locking members, as for example, locking pins. Other types of plate members which can be used to receive locking pins or other locking elements are hereafter described.

FIG. 22 illustrates another form of plate or locking disk 240, which may be used in the present invention. This locking disk 240 would be located, for example, in the opening at the waste arm pipe cover or otherwise, at the opening in the short leg of the J-trap cover. Pins would be located on the opposite of each of these members. In this case, the disk 240 is similarly provided with an opening 242 in order to receive the pipe of the pipe installation. In addition, the disk 242 is provided with a plurality of elongate slots 244 extending throughout the circumference of the disk. In this case, it can be observed that the slots 244 are located in a position to receive locking pins of any of the types previously described. For example, locking pins of the type illustrated in embodiments of FIGS. 18–20 could be used.

The large number of slots located in the disk 240 provides for the locating of the waste arm pipe cover at a variety of angles relative to the plane of the J-trap cover. As indicated previously, the waste arm may extend at an angle which does not lie in the same plane as the J-trap. Consequently, the covers must be oriented to match the pipe installation. The fact that the disk 244 includes a plurality of openings allows one pipe cover to be rotated relative to the other.

FIG. 23 illustrates a locking mechanism 246, similar to the locking mechanism 240, and includes a disk 248 with a plurality of locking slots 250 having diametrically enlarged opened ends 252, as well as reduced width slots or tails 254 extending therefrom. In this way, the locking pins or fasteners, such as the locking pins 216, can be inserted in the enlarged diameter open ends 252 with the jacket rotated slightly so that the heads of the pins are located within the reduced width slots or tails 254. These heads on the pins would have a larger width then the slots 254 so as to become locked in the openings 250. When the one cover piece is rotated relative to the other, as for example, when the waste arm pipe cover is rotated relative to the J-trap cover, the heads of the pins will be moved back into the heads of the enlarged open ends 252, so that one cover can be disengaged from the other.

FIG. 24 illustrates an embodiment of an invention in which there is a J-trap pipe cover 256, and a straight pipe cover functioning as a waste arm pipe cover 258. The pipe cover 258 similarly has an enlarged opening 260 at one end thereof, and which faces and is adapted to cooperate with the J-trap pipe cover 256.

The pipe cover 256 is provided with an enlarged disk 261 at an open end of the short leg of the J-trap section thereof, and which disk similarly is provided with an opening 262 to receive a pipe of the installation extending therethrough. The opening 260 is also located at a slightly wall thickened area 264. This area 264 is provided with a diametrically increased recess 266. The ring or disk 261 is provided with hooks 268. These hooks are in the nature of upstanding elements having outwardly protruding hook ends. In this way, the hooks can be forced into the recess 266 since the cover material will resiliently spread apart under force, allowing the outwardly struck ends of the hooks 268 to fit within the recess 266. The resiliency of the waste arm pipe cover 258 will then allow the material to contract about these hooks and retentively hold the J-trap pipe cover 256 against the waste arm pipe cover 258.

By reference to FIG. 25, it can be observed that the various hooks 268, are similar to those hooks used in the mounting of a toilet bowl to a floor structure. Moreover, these hooks 268 are circumferentially located about the periphery of the ring 261.

FIG. 26 illustrates an embodiment similar to that illustrated in FIGS. 24 and 25, and which also employs a waste arm pipe cover 270 and a J-trap pipe cover 272. The pipe cover 270 is similarly provided with an enlarged opening 274 at one end. In place of the ring 260, the J-trap pipe cover is provided with an enlarged wall thickened end 276, which still has an opening 278 to receive a pipe of a pipe installation. Moreover, the open end of the pipe cover 270 is provided with a hardened ring 280 fitted therein. This ring is provided with a recess 282 sized to receive the ends of the hooks, such as the hooks 268 located on the upper wall thickened end of the pipe cover 272.

FIG. 27 illustrates an embodiment in which there is provided a waste arm pipe cover 284 cooperating with a J-trap pipe cover 286. The J-trap pipe cover 286 has a short leg with an outwardly extending enlarged flange 288 at its upper end and surrounding an opening 290 to receive a pipe of a pipe installation. The waste arm pipe cover 284 has a thickened wall section 292 at the end surrounding an opening 294. In this way, pins 296 can be extended through channels 298 formed in the thickened wall section 288, as best shown in FIG. 27. These pins, which are in the nature of set screws, would then be able to bore or tap into and penetrate the thickened wall section 292, thereby lockably holding the J-trap pipe cover 286, to the waste arm pipe cover 284.

FIG. 28 illustrates an embodiment similar to FIG. 27, in which a waste arm pipe cover 284 and a similar P-trap pipe cover 286 can be used. In this case, the waste arm pipe cover 284 is provided with a plurality of recesses 300 circumferentially spaced about the thickened wall section 292. The recesses in this case are provided with arrow shaped sections 302 sized to receive arrow type locking pins 304, as best shown in FIG. 28. These arrow type locking pins have enlarged bottom heads 306 and arrows 308, with the latter adapted to extend into the arrow shaped openings 302. In this way, another form of locking means is provided to releasably hold the waste arm pipe cover 284 to the J-trap pipe cover 286.

FIG. 29 illustrates an embodiment of an invention using a J-trap pipe cover 310, and a cooperating waste arm pipe cover 312. The upper end of the short leg of the J-trap pipe cover is provided with an enlarged flange 314, and in like manner, the end of the pipe cover 312 surrounding an opening 316, is provided with an enlarged flange 318. In this way, the flange 318 can be provided with a plurality of circumferentially located openings 320 in order to receive locking screws 322, all as best shown in FIG. 29. These latter embodiments illustrate the numerous ways in which a waste arm pipe cover can be lockably secured to a J-trap pipe cover in any of a variety of positions relative to the plane of the J-trap pipe cover.

FIGS. 30–32 illustrate various means of using cable ties for holding the jackets on a pipe of a pipe installation. As indicated previously, each of the jackets are longitudinally slit as shown in FIGS. 3, 3A, 4, 5 and 6 of the drawings. In this case, the cable ties can be used individually, or they can be used in combination with other locking features, such as fiber fastening strips or the like.

FIG. 30 illustrates an embodiment of a jacket 326 which may be a leg of any of the previously described jackets. In this case, the jacket 326 is provided a jacket wall 328 with a plurality of integrally formed projections 330 formed thereon. These projections 330, which are inwardly struck, are provided with openings 332 in order to receive cable ties or the like. In this case, the cable ties could be inserted through the openings 332 in order to locate the cable ties around the periphery of the inside of the jacket 326. When the cable ties are locked together, they will retentively hold the jacket about a pipe of a pipe installation.

FIG. 31 illustrates an embodiment very similar to FIG. 30, except that it has a smaller sized opening 334. In this case, cable ties could again be used. In like manner, FIG. 32 illustrates an embodiment of the same pipe 326 having a slightly different arrangement of a projected section 336, having openings 338, again, to receive cable ties.

It can also be observed that the projections which receive the cable ties in FIGS. 30–32 also serve as ribs or like members to space a pipe from the wall of the pipe covering jacket. Thus, these projections could be used in place of or in addition to ribs formed on the inner surface of the jacket.

FIGS. 33–45 illustrate various jacket spacing projections on the interior surface of the jackets of the present invention. These jacket spacing projections may take the form of interior ribs or other spacers which permit the spacing of the jacket from the pipe about which it is disposed. In this way, the pipe is further heat insulated from the exterior surface of the jacket and in addition, there is a more uniform fit of the jacket about the pipe.

Referring to FIG. 33, it can be seen that there is an end elevation of a cylindrically shaped jacket 340, having a longitudinal slit 342. Formed on the interior surface of the jacket are a plurality of ribs 344. Although ribs have been used conventionally in the past, the rib construction and the rib configuration on the jackets of the present invention are different. Referring to FIGS. 34 and 35, there are a plurality of vertically arranged ribs 346. These ribs 346 have tapered upper and lower edges 348, as best shown in FIG. 34. Moreover, they are regularly spaced around the interior surface of the jacket. They can extend for the full length of the jacket, although individual rows of these ribs or columns of these ribs could be provided.

FIG. 36 illustrates an embodiment of the jacket 344 having plurality of short vertically arranged stub type ribs 350. In this case, it can be observed that there are a large number of ribs 350 in each column of ribs, and moreover, there are regularly spaced apart ribs extending about the length of the jacket, also as best shown in FIG. 37 of the drawings.

FIG. 38 illustrates an embodiment of the jacket 344, but having ribs spaced apart from one another, such as individual ribs 352 spaced apart from one another, but in individual rows 354, for example. However, the ribs in the first row are offset from ribs in the second row and so forth.

FIGS. 39 and 40 illustrate an embodiment of the invention in which there are rows and columns of button like projections 356 on a jacket 344. In this case, there are regular rows and regular columns of button-like projections. These projections or so-called "buttons" are merely round hemispherically shaped projections which may be integrally formed on the wall of the jacket.

FIG. 41 illustrates an embodiment of a jacket 344 having a plurality of so-called "buttons" or semi-hemispherically shaped projections 358. In this case, the projections 358 are irregularly spaced on the interior wall of the jacket 344.

FIG. 42 illustrates an embodiment of a jacket 344 showing the interior surface thereof, and where somewhat diamond shaped projections 360 are formed on the interior surface thereof, also as best shown in FIG. 43. In this case, it can be observed that the diamond shaped projections 360 exist in regular rows and regular columns. However, again, they could be located in various spaced relations and they could be irregularly located in the manner as the buttons 358 of FIG. 41 are located.

FIGS. 44 and 45 illustrate a jacket 344 having a plurality of rod like shaped projections 362 on the interior surface thereof. These projections 362 extend inwardly into the interior a much greater distance than do the "button" like projections 356, and moreover, can extend into the jacket for a greater depth than the other ribs described in FIGS. 33–43 hereof. Moreover, and although not illustrated, it should be recognized that different length projections which extend into the interior surface of the jacket at different depths could be provided.

FIG. 46 illustrates an embodiment of a jacket combination, including a J-trap jacket 366 and a waste arm jacket 368. Moreover, they are disposed about a pipe configuration, including a J-bend which may be in the form of a so-called U-bend 370, and a waste arm, which in this case, is L-shaped 372. Moreover, the waste arm 372 is connected to the J-bend 370 by means of a locking nut 374. In this case, the J-trap jacket 366 is provided with an interior flange 376 at the upper end of the short leg of this jacket. In like manner, the waste arm jacket 368 is similarly provided with an interiorly presented flange 378, surrounding an opening 380 in the jacket 368. The two flanges 376 and 378 are located in abutting engagement, as best shown in FIG. 46.

A fitting 382 is provided for lockably holding the two jackets together. In this case, the fitting 382 is provided with a cylindrically shaped body 384 having an upper and lower engagement flanges 386 and 388. It can be observed that the flange 386 engages the upper surface of the locking flange 378 on the jacket 368. In like manner, the flange 388 engages the lower surface of the flange 376 on the jacket 366. The fitting can be disposed about the pipe such as the pipe 372, as illustrated in FIG. 46. The two jackets can then be pressed against the fitting so that the flanges 376 and 378 will resiliently fit into the recess formed by the flanges 386 and 388.

FIGS. 47–50 illustrate various means for closing a longitudinal slit on a jacket. Alternate means were previously illustrated in FIGS. 3, 3A, 4 and 5, as well as FIG. 6A of the drawings. These additional embodiments, at least in FIGS. 47–49, utilize types of cable ties.

In FIG. 47 there is illustrated a jacket 390 which is cylindrically shaped in cross-section and having a longitudinal slit 392, which permits the jacket to be opened and disposed about a pipe of a pipe installation. The jacket is also provided with inwardly struck tabs 394 and 396 at the ends of the jacket along the longitudinal slit 392. One side of the jacket with the flange 396 is provided with an opening to receive a cable tie 398. This cable tie extends through a grommet on the opposite flange 394. Moreover, one end of the cable tie 398 is provided with a buckle 402 for releasably locking the ends of the jacket together about the pipe. In this case, the cable tie 398 could be locked and stuffed into the elongate slit 392 after the jacket has been closed.

FIG. 48 illustrates an embodiment in which the jacket 390 is provided with an enlarged hub or locking housing 404. In this way, the cable tie 398 can be threaded through an opening 406 on one side of a longitudinal slit 408, and into the lock housing 404. The cable tie is similarly provided with a buckle 402 so that the two ends of the cable tie can be secured together.

FIG. 49 illustrates an embodiment of the invention in which there are lock housings 404, as well as an additional lock housing 410, on an opposite side of the longitudinal slit 408. The lock housing 404, and the lock housing 410 would be of similar construction and would receive the cable tie 398. These cable ties can surround fiber fastening pads 412, as also illustrated in FIG. 49 of the drawings. This arrangement is also more fully illustrated in FIG. 50 of the drawings.

FIGS. 51 through 56 illustrate other arrangements for securing the upper end of a J-shaped pipe cover 420 to a straight waste arm pipe cover 422. In the embodiment of FIG. 51, the pipe cover 420 has an upper outwardly struck annular flange 424 which is resilient and will snap fit through an opening 426 formed in the lower end of the jacket 422. Moreover, the flange 424 is locked in this locking position by means of one or more set screws 428, as shown.

FIG. 52 illustrates an embodiment in which a relatively hard ring 430 is mounted at an opening 432 in the straight waste arm jacket 422. This ring 430 receives an axially projected flange 434 on the upper end of the J-trap jacket 436. Any means to retain the flange 434 within the opening 432 of the ring 430 may be employed, such as set screws or the like.

FIG. 53 illustrates an embodiment of a waste arm jacket 440 and a J-trap jacket 442. The upper end of the J-trap jacket 442 is provided with a diametrally reduced integrally formed upwardly projecting axially extending flange 444. Moreover, the flange is provided with an integrally formed outwardly struck circularly shaped locking tab 446. The jacket 440 is similarly provided with an opening 448 adjacent an end thereof and located to receive the upper end of the jacket 442. Moreover, the opening is integrally formed with an annular recess 450. In this case, the recess 450 is sized to engagingly receive the locking tab 446 on the flange 444. Again, the flange 446, and for that matter, the material surrounding the opening 448, are sufficiently resilient so that the locking tab 446 can snap fit into the recess 450.

FIG. 54 illustrates an embodiment of a waste arm jacket 452 and a J-trap jacket 454. In this case, a locking arrangement similar to that previously described is used. However, the upper end of the J-trap jacket 454 is provided with an axially extending diametrally reduced flange 45 plastic ring 458 having an outwardly projected locking tab 460. In addition, an opening 462 at an end of the waste arm jacket 452 is a ring 464 having a recess 466. In this case, the locking tab 460 will snap fit into the recess 466 in the ring 464. Again, the ring 464 would be made of a material sufficiently resilient so as to allow the locking tab 460 to extend into the recess 466. Moreover, and as indicated, the locking tab 460 is also resilient.

FIG. 55 illustrates an embodiment of the invention very similar to that illustrated in FIG. 54. In this case, the locking ring 458 is actually fitted into a recess 468 formed in the upper end of the flange 456. In like manner, the ring 464 which was merely located inside of the jacket 452, in this embodiment, is located in a recess 470 formed in a thickened section 472 of the jacket, and surrounding the opening 462.

FIG. 56 illustrates an embodiment of the invention in which there is a J-trap jacket 480 and a waste arm jacket 482. The waste arm jacket 482 has an opening 484 at one end thereof and surrounded by a thickened wall section 486. Moreover, the thickened wall section has a plurality of downwardly projecting locking plugs 488. The jacket 480 is similarly provided with a thickened wall section 490 at its upper end, and also with a plurality of recesses 492 sized to receive the locking plugs 488.

In this particular embodiment, the locking plugs 488 have a threaded section 494 and in like manner, the recesses 492 have threaded inner walls 496. In this case, the locking plugs 494 are sufficiently resilient so that they can be forced into the various recesses or holes 492. Moreover, the threaded sections 494 will tightly fit within the threaded section 496, thereby providing a positive locking action.

FIG. 57 also illustrates a conventional P-trap pipe arrangement frequently found in under-sink installations and similar installations. Although the pipe arrangement illustrated in FIG. 57 is that of a J-shaped pipe trap and an L-shaped waste arm pipe, it should be understood that the cover system of the invention, as hereafter described, is operable with essentially any pipe assembly configuration.

In the embodiment of the invention as shown in FIG. 57, there is shown a J-shaped pipe 500 connected to an L-shaped waste arm pipe 502 through a conventional locking mechanism 504, such as a locking nut or the like. The J-shaped pipe has an elongate leg 506 and an arcuate lower end 508, in the manner as shown.

The heat protective cover system of the invention comprises in the embodiment as shown, a J-trap cover 510 along with an L-shaped waste arm cover 512 and which are assembled together to form the so-called "P-trap". In this respect, and to some extent, they generally follow, but do not show the exact contour of the pipe assembly. In other words, the assembled pipe covers actually hide the actual shape of the pipe arrangement and provides a much more distinctive and styled appearance than the conventional cover pieces which are envlopely wrapped about individual pipes.

By reference to FIG. 58, it can be observed that the pipe covers 510 and 512 are of hexagonally shaped cross-section. In order to protectively fit about the pipe without any loose fitting arrangement, the pipe covers may be provided with projections 24 which extend inwardly from various portions of the walls and, particularly, the corner portions thereof, and engage the pipe. This will hold the pipe cover sections in desired spaced apart relationship, such that each of the walls are effectively equally spaced from the pipe.

FIG. 59 illustrates an alternate embodiment in which each cover, such as the cover 516, has an outer hexagonal shape along with an integral inner circular wall 518. Thus, the pipe cover of FIG. 59 has an outer hexagonally shaped wall configuration and an inner circular bore sized to receive the individual pipe sections, such as the pipe 506.

It can also be observed that this jacket or cover 516 has a relatively thick wall section in certain regions which thereby eliminates any requirement for ribs or the like. Moreover, and because of the thick body section, it provides a much greater heat insulation capacity. In addition, it allows for close fitting about the pipe and still presents a different shape.

FIG. 60 shows an alternate pipe cover 520 which, in this case, is diamond-shaped. Thus, FIG. 60 shows the availability of forming the pipe cover pieces in a variety of differing shapes. Thus, and for example, pentagonally shaped pipe covers, octp45×10 shaped pipe covers, and the like, may also be used. For that matter, it is not necessary to provide regular known shapes for use in the pipe cover configuration. For that matter, irregular shapes could be used, as well. However, in each case, the inner bore of the jacket or cover would necessarily have to have a configuration to accommodate the pipe about which the jacket is disposed.

FIGS. 61 through 63 illustrate several preferred arrangements for locking together abutting pipe covers or jackets of the type previously described, which have a non-circular cross-sectional shape. Although any of the previously described embodiments may be used, with the non-circular cross-sectional shape, those illustrated and described in connection with FIGS. 61 through 63 are preferred. In this case, the J-trap jacket 510, or otherwise, the waste arm jacket 512, may be provided with a diametrally reduced flange 514 at its outer end. Thus, the J-trap jacket 510 is provided with a diametrally reduced outwardly projecting flange 520. This flange fits within the opening 522 of the jacket 512, in the manner as shown. Moreover, it can be retained in this fixed position by means of locking screws 524.

FIG. 62 illustrates an embodiment where the jacket 510, for example, has an outwardly projecting axially extending flange 530, and which fits within a diametrally enlarged recess 532 of the jacket 512. Again, the diametrally reduced flange 530 could be secured within the recess 532 by any conventional means, as for example, an adhesive or the like. However, in the embodiment as shown, set screws or the like would be effective for purposes of achieving the locking action.

FIG. 63 illustrates another embodiment for locking a non-circular cover to another non-circular cover. In FIG. 63 there is provided a pipe cover 540, such as a J-trap cover and a waste arm cover 542. The pipe cover 540 is provided with a continuous body wall 544 and a central bore 546. In addition, at its right-hand end, reference being made to FIG. 63, the pipe cover 540 is provided with an enlarged socket 548 and which is sized to snugly, but nevertheless removably, receive a flange or projection 550 on the cover 542. The pipe cover 542 similarly presents a flat abutment edge 558.

When the abutment edge 558 abuts against a transverse end 560 of the jacket 540, the two will form a tight abutment, such that the pipe sections will appear as though they are continuous. The flange 550 on the jacket 542 is also provided with an outwardly projecting circular locking element 564. This locking element 564 can releasably snap fit into the recess 548 of the jacket 544. In this way, there will be no unsightly connection mechanism for connecting the two pieces of pipe together. If desired, small set screws could be used for extending through the pipe wall and into the flange 550 for purposes of locking same together.

Thus, there has been illustrated and described a unique and novel protective cover system for water pipes, and which thereby fulfills all of the objects and advantages which have been sought. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A protective cover system for water pipes of the type used in an undersink pipe installation and which pipe installation includes a J-shaped pipe and a waste arm pipe connected thereto, and adapted for use in any under-sink pipe orientation of the J-shaped pipe and the waste arm pipe, said cover system comprising:
   a) at least one jacket having a longitudinal slit and capable of being disposed about a portion of the pipe installation;
   b) said longitudinal slit in said jacket allowing said jacket to be spread apart to be disposed about said pipe and close back together forming a pair of opposed and connectable margins adjacent said longitudinal slit;
   c) an inwardly struck flange at each of said margins and extending along said margins and having opposed faces which are engageable with one another;
   d) a fastening means for securing together the opposed faces of the inwardly struck flanges and the margins of the jacket adjacent said longitudinal slit to completely cause an envelopment of the jacket about a pipe of the pipe installation; and
   e) said fastening means comprising a plurality of spaced apart individual fasteners permanently secured to one of said opposed faces of said flanges and a plurality of cooperating spaced apart fasteners secured to an opposite opposed face of the other of said flanges adjacent said longitudinal slit and which fasteners create a releasable fastening therebetween.

2. The jacket of claim 1 further characterized in that the fastening means on one opposed face on the flanges of the jacket at the longitudinal slit are snaps and the cooperating fastening means on the opposite margin of the jacket adjacent the slit are cooperating snaps.

3. The jacket of claim 1 further characterized in that the fastening means on one adjacent the longitudinal slit are individual pieces of fiber fastening strips and on the opposite opposed face of the jacket adjacent the longitudinal slit are cooperating fiber fastening means.

4. The jacket of claim 1 further characterized in that a plurality of cable ties are secured within the jacket and extend outwardly therefrom for connection to a free end of that cable tie to thereby permanently secure the jacket to the pipe.

5. The jacket of claim 4 further characterized in that the cable ties extend through lock housings on the opposite sides of each of the margins of the jacket adjacent the longitudinal slit.

6. The jacket of claim 5 further characterized in that fiber fastening strips surround the cable ties and the regions where the cable ties pass through walls of the jacket.

7. A protective cover system for water pipes of the type used in an undersink water pipe installation and which includes a J-trap pipe and a waste arm connected thereto, said cover system comprising:
   a) a J-trap cover having a J-shaped configuration and adapted to extend about the J-trap of an undersink water pipe installation;
   b) a waste arm cover connected to said J-trap cover and adapted to extend about a waste arm of the pipe installation;
   c) said waste arm cover having a relatively straight cylindrical cross-section from end to end over its length and a straight central axis and having no portion thereof extending about an axis other than said straight central axis; and
   d) means forming an opening in said waste arm and not extending outwardly of a cylindrical plane defining the outer surface of said waste arm and adjacent one end thereof to mate with an end of the J-trap cover.

8. The protective cover system for water pipes of claim 7 further characterized in that said J-trap cover is provided with an axially extending projection at one end facing said opening in the waste arm cover and which is adapted to extend into that opening for releasable locking securement therein.

9. The protective cover system for water pipes of claim 8 further characterized in that a mechanical fastener means is used to secure said projection on said J-trap cover within the opening of said waste arm cover.

10. The protective cover system for water pipes of claim 8 further characterized in that said projection forms part of a plate located at an end of the J-trap cover and which is secured within that end of the J-trap cover, said projection being in the form of a flange sized to extend into and snugly received into the opening of said waste arm cover.

11. The protective cover system for water pipes of claim 8 further characterized in that a plate is located at the opening of said waste arm cover and said plate has an opening therein adapted to receive the projection on said J-trap cover.

12. The protective cover system for water pipes of claim 7 further characterized in that a fiber fastening attachment strip is located on an exterior face of the waste arm cover having the opening therein and extending in relation to the opening, and a separate fiber fastening attachment strip is located on the upper end of said J-trap cover for releasable attachment.

13. The protective cover system for water pipes of claim 7 further characterized in that said J-trap cover is provided with arrows projecting therefrom, and said waste arm cover is provided with recesses sized and located to receive heads of the arrows on said J-trap cover.

14. The protective cover system for water pipes of claim 13 further characterized in that said arrows are mounted on a plate in an end of said J-trap cover and said arrows extend into recesses formed in a plate at the opening of said waste arm cover and which recesses are sized and located to lockably receive said arrows.

15. The protective cover system for water pipes of claim 7 further characterized in that locking pins having enlarged heads are located at an end of said J-trap cover facing said waste arm cover and extend into recesses formed in and surrounding the opening of said waste arm cover, and which recesses have enlarged portions adapted to receive the enlarged heads of the locking pins.

16. The protective cover system for water pipes of claim 7 further characterized in that said waste arm cover has a plurality of hooks extending generally perpendicular to the central axis of said waste arm cover and from an end thereof and surrounding said opening, said hooks extending to a facing end of said J-trap cover.

17. A protective cover system for water pipes of the type used in an undersink pipe installation and which includes a J-shaped pipe section and a waste arm connected thereto, said cover system comprising:
   a) at least one jacket having a longitudinal slit and capable of being disposed about a portion of the pipe installation and having a pair of opposed margins adjacent said slit;
   b) a second jacket having a longitudinal slit in said second jacket forming a pair of opposed margins adjacent said longitudinal slit in said second jacket;
   c) a fastening means on each of said jackets for securing the margins of the jackets together adjacent said longitudinal slit to completely cause an envelopment of the jackets about the pipe on which it is disposed;
   d) said fastening means on each of said jackets having a plurality of loops located on the interior thereof and which loops receive a cable tie extending therethrough and with ends of said cable tie extending outwardly from the longitudinal slit on said jacket; and
   e) each of the cable ties being adapted for engagement with a free end thereof to thereby permanently secure the jackets about a water pipe in a pipe installation.

18. The protective cover system for water pipes of claim 17 further characterized in that said loops are provided in pairs on each jacket and each of the loops in a pair are alignable and receive the cable ties in the same manner as a belt extending through loops.

19. A protective cover system for water pipes of the type used in an undersink pipe installation and which includes a J-shaped pipe and a waste arm connected thereto, said cover system comprising:
   a) at least one jacket having a cylindrical cross-section and a longitudinal slit extending along the length of the jacket to be capable of being disposed about a portion of the pipe installation;
   b) said longitudinal slit in said jacket allowing said jacket to be spread apart to be disposed about said pipe and close back together forming a pair of opposed margins adjacent said longitudinal slit;
   c) a plurality of small discrete projections integral with the interior surface of said jacket and protecting inwardly into the interior of said jacket to engage and hold the jacket in spaced-apart relation to the wall of the pipe it surrounds, said projections extending longitudinally along the length of the pipe and circumferentially around the interior of the jacket; and
   d) said projections also being closely space apart from one another so that there is a high density of projections extending into the interior of said jacket so that they may be spaced from or engage the surface of the walls of the pipe surrounded by said jacket.

20. The protective cover system for water pipes of claim 19 further characterized in that said projections are irregularly spaced around the interior surface of the wall of said jacket.

21. The protective cover system for water pipes of claim 19 further characterized in that said projections are semi-hemispherically shaped projections located on the interior wall of the jacket.

22. The protective cover system for water pipes of claim 19 further characterized in that projections are rod like and project into the interior of said jacket for a substantial distance.

23. The protective cover system for water pipes of claim 19 further characterized in that said projections are diamond-shaped projections.

24. The protective cover system for water pipes of claim 23 further characterized in that each of said jackets are longitudinally split and have means to attach the margins of each of said jackets together along said longitudinal slit when disposed about said pipe.

25. The protective cover system for water pipes of claim 24 further characterized in that said fastening means comprises an axially extending fastening element at said free end of said J-trap cover and extendable to a region surrounding said opening in the waste arm cover to be in securement therewith.

26. The protective cover system for water pipes of claim 25 further characterized in that said fastening element is a mechanical fastener means.

27. A protective cover system for water pipes of the type used in an undersink pipe installation and which includes a J-shaped pipe section and a waste arm connected thereto, said cover system comprising:

a) a system of a plurality of jackets with each having a longitudinal slit extending along the length of the jacket to be capable of being disposed about a portion of the pipe installation;
  b) said longitudinal slit in each said jacket allowing said jacket to be spread apart to be disposed about said pipe and close back together forming a pair of opposed margins adjacent said longitudinal slit; and
  c) each of said jackets also having a polygonal non-rectangularly arranged cross-sectional shape to provide a highly aesthetic appearance unlike a cylindrically shaped pipe, but each of said jackets also having an interior sized and shaped to receive and accommodate a pipe installation.

28. A protective cover system for water pipes of the type used in an undersink water pipe installation and which includes a J-trap pipe and a waste arm connected thereto, said cover system comprising:

a) a J-trap cover jacket having a cylindrical cross-sectional shape and a J-shaped configuration and adapted to extend about the J-trap of an undersink water pipe installation, said J-trap cover also having a pair of legs with a free end in one of said legs;
  b) a waste arm cover connectable to said J-trap cover and adapted to extend about a waste arm of the water pipe installation; and
  c) said waste arm cover having cylindrical cross-section portion to mate with an end of the J-trap cover; and
  d) fastening means extending between said free end and said J-trap cover and a region of said waste arm cover surrounding the opening therein, said fastening means comprising a fastener element being securable with said J-trap cover and said free end of said waste arm cover.

29. The protective cover system for water pipes of claim 28 further characterized in that a plate is located at the free end of said J-trap cover and has a projecting flange located at the free end of the J-trap cover and which is secured within that end of the J-trap cover, said flange being sized to extend into and snugly received in the opening of said waste arm cover.

30. The protective cover system for water pipes of claim 29 further characterized in that a plate is also located at the opening of said waste arm cover and said plate has an opening therein adapted to receive the projection on said J-trap cover.

31. The protective cover system for water pipes of claim 29 further characterized in that fiber fastening attachment strips are located on the waste arm cover having the opening therein and on the end of said J-trap cover for releasable attachment.

32. The protective cover system for water pipes of claim 29 further characterized in that said fastening means on said J-trap cover is operatively provided with arrows protecting therefrom and said waste arm cover is provided with recesses sized to receive heads of the arrows on said J-trap cover.

33. The protective cover system for water pipes of claim 32 further characterized in that said arrows are mounted on a plate at said free end of said J-trap cover and said arrows extend into recesses formed in a plate at the opening of said waste arm cover.

34. The protective cover system for water pipes of claim 28 further characterized in that locking pins having enlarged heads are operatively located at said free end of said J-trap cover and extend into recesses formed surrounding the opening of said waste arm cover and which recesses have enlarged portions adapted to receive the enlarged heads of the locking pins.

35. The protective cover system for water pipes of claim 28 further characterized in that said waste arm cover has a plurality of hooks extending axially from an end thereof and surrounding an area in proximity to a circumference of said free end of said J-trap cover and said waste arm cover has a recess sized to receive said hooks in locking engagement therewith.

* * * * *